(12) United States Patent
Lobachinsky et al.

(10) Patent No.: US 11,226,261 B2
(45) Date of Patent: Jan. 18, 2022

(54) OPTICAL DEVICE TESTING METHOD AND APPARATUS

(71) Applicant: Lumus Ltd., Ness Ziona (IL)

(72) Inventors: Lilya Lobachinsky, Tel Aviv (IL); Yochay Danziger, Kfar Vradim (IL); Nitzan Livneh, Rehovot (IL); Jonathan Gelberg, Modiin (IL)

(73) Assignee: LUMUS LTD., Ness Ziona (IL)

( * ) Notice: Subject to any disclaimer, the term of this patent is extended or adjusted under 35 U.S.C. 154(b) by 0 days.

(21) Appl. No.: 16/769,285

(22) PCT Filed: Dec. 2, 2018

(86) PCT No.: PCT/IB2018/059550
§ 371 (c)(1),
(2) Date: Jun. 3, 2020

(87) PCT Pub. No.: WO2019/106636
PCT Pub. Date: Jun. 6, 2019

(65) Prior Publication Data
US 2020/0292417 A1    Sep. 17, 2020

Related U.S. Application Data

(60) Provisional application No. 62/597,465, filed on Dec. 12, 2017, provisional application No. 62/593,946, (Continued)

(51) Int. Cl.
*G01M 11/00* (2006.01)
*G02B 27/00* (2006.01)
*G02B 27/01* (2006.01)

(52) U.S. Cl.
CPC ......... *G01M 11/35* (2013.01); *G02B 27/0081* (2013.01); *G02B 27/0172* (2013.01);
(Continued)

(58) Field of Classification Search
CPC .................................................... G01M 11/35
See application file for complete search history.

(56) References Cited

U.S. PATENT DOCUMENTS 3,969,023 A    7/1976  Brandt et al.
5,923,476 A *  7/1999  Heffner .............. G02B 27/0172
                                                    359/630
(Continued)

FOREIGN PATENT DOCUMENTS

JP    2001021448    1/2001
JP    2013231652    11/2013

*Primary Examiner* — Tarifur R Chowdhury
*Assistant Examiner* — Omar H Nixon
(74) *Attorney, Agent, or Firm* — Mark M. Friedman

(57) ABSTRACT

At various positions in an eye motion box (EMB) an output image from an optical device can be captured and analyzed for detection and evaluation of image propagation via the optical device. Optical testing along a specific axis can evaluate optical engine transfer function uniformity across facet's active area, detect the existence and degree of "smearing" of a projected image from an optical device, and detect the existence and degree of a "white stripes" (WS) phenomenon related to scattering and diffraction in the wedge-to-LOE interface. A variety of metrics can be derived for quality control and feedback into the production system, and for disposition of the optical devices.

11 Claims, 16 Drawing Sheets

Related U.S. Application Data filed on Dec. 3, 2017, provisional application No. 62/593,944, filed on Dec. 3, 2017.

(52) U.S. Cl.
CPC .. *G02B 27/0179* (2013.01); *G02B 2027/0174* (2013.01); *G02B 2027/0181* (2013.01)

(56) References Cited

U.S. PATENT DOCUMENTS

| | | | |
|---|---|---|---|
| 7,612,879 B2 | 11/2009 | Stumpe et al. | |
| 7,724,409 B2 | 5/2010 | Lin et al. | |
| 8,016,428 B2 | 9/2011 | Kasazumi et al. | |
| 9,213,178 B1* | 12/2015 | Giri | G02B 27/0172 |
| 9,810,904 B1* | 11/2017 | Bierhuizen | G02B 27/0172 |
| 2002/0186179 A1 | 12/2002 | Knowles | |
| 2003/0165017 A1 | 9/2003 | Amitai | |
| 2004/0032660 A1 | 2/2004 | Amitai | |
| 2004/0033528 A1 | 2/2004 | Amitai | |
| 2004/0080718 A1 | 4/2004 | Kojima | |
| 2005/0078388 A1 | 4/2005 | Amitai | |
| 2005/0083592 A1 | 4/2005 | Amitai et al. | |
| 2005/0180687 A1 | 8/2005 | Amitai | |
| 2005/0281515 A1 | 12/2005 | Togami | |
| 2007/0091445 A1 | 4/2007 | Amitai | |
| 2007/0097513 A1 | 5/2007 | Amitai | |
| 2008/0106775 A1 | 5/2008 | Amitai | |
| 2008/0151379 A1 | 6/2008 | Amitai | |
| 2008/0186604 A1 | 8/2008 | Amitai | |
| 2008/0192239 A1 | 8/2008 | Otosaka | |
| 2008/0198471 A1 | 8/2008 | Amitai | |
| 2008/0278812 A1 | 11/2008 | Amitai | |
| 2008/0285140 A1 | 11/2008 | Amitai | |
| 2009/0052046 A1 | 2/2009 | Amitai | |
| 2009/0052047 A1 | 2/2009 | Amitai | |
| 2009/0097127 A1 | 4/2009 | Amitai | |
| 2009/0122414 A1 | 5/2009 | Amitai | |
| 2009/0153437 A1 | 6/2009 | Aharoni | |
| 2010/0171680 A1 | 7/2010 | Lapidot et al. | |
| 2010/0202048 A1 | 8/2010 | Amitai et al. | |
| 2010/0214635 A1 | 8/2010 | Sasaki et al. | |
| 2011/0050547 A1 | 3/2011 | Mukawa | |
| 2011/0304828 A1 | 12/2011 | Khechana | |
| 2012/0179369 A1 | 7/2012 | Lapidot et al. | |
| 2013/0229717 A1 | 9/2013 | Amitai | |
| 2013/0276960 A1 | 10/2013 | Amitai | |
| 2013/0279017 A1 | 10/2013 | Amitai | |
| 2014/0118813 A1 | 5/2014 | Amitai et al. | |
| 2015/0233824 A1 | 8/2015 | Richards et al. | |
| 2016/0062119 A1 | 3/2016 | Fitch et al. | |
| 2016/0238843 A1* | 8/2016 | Dobschal | G02B 27/30 |
| 2016/0246056 A1* | 8/2016 | Dobschal | G02B 27/0081 |
| 2017/0169747 A1 | 6/2017 | Richards et al. | |
| 2017/0205277 A1 | 7/2017 | Ohtsuki | |
| 2020/0033572 A1 | 1/2020 | Danziger et al. | |
| 2020/0041713 A1 | 2/2020 | Danziger | |
| 2020/0150330 A1 | 5/2020 | Danziger et al. | |
| 2020/0183159 A1 | 6/2020 | Danziger | |
| 2020/0183170 A1 | 6/2020 | Amitai et al. | |
| 2020/0200963 A1 | 6/2020 | Eisenfeld et al. | |
| 2020/0209667 A1 | 7/2020 | Sharlin et al. | |
| 2020/0241308 A1 | 7/2020 | Danziger et al. | |
| 2020/0249481 A1 | 8/2020 | Danziger et al. | |
| 2020/0278557 A1 | 9/2020 | Greenstein et al. | |
| 2020/0285060 A1 | 9/2020 | Amitai | |
| 2020/0292417 A1 | 9/2020 | Lobachinsky et al. | |
| 2020/0292744 A1 | 9/2020 | Danziger | |

* cited by examiner

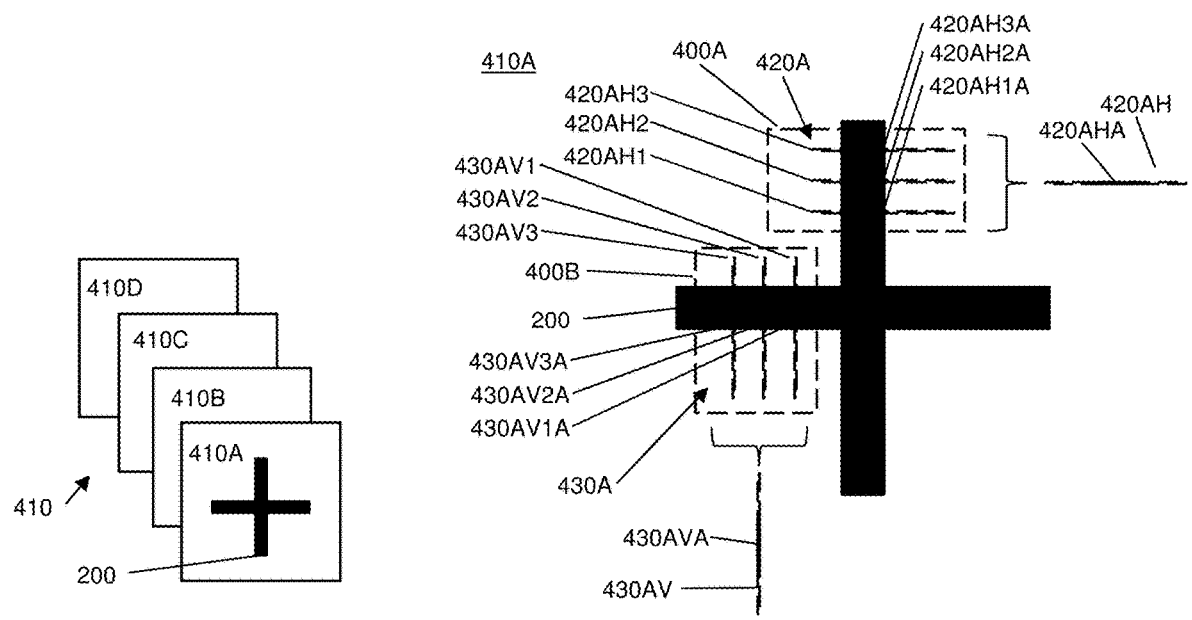
FIG.4A
FIG. 4C
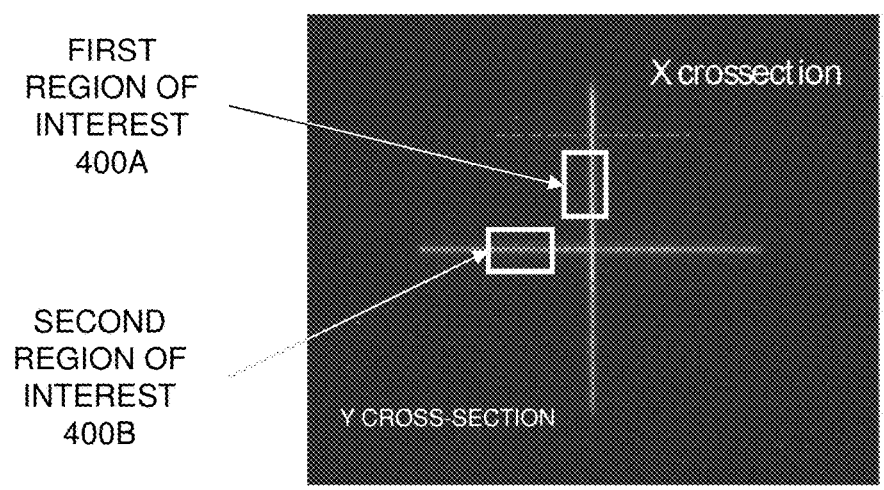
FIG. 4B

|    | Left | Top  | Width | Height | Minimum | Maximum |
|----|------|------|-------|--------|---------|---------|
| 0  | 1094 | 773  | 351   | 361    | 0.05    | 1       |
| 1  | 800  | 773  | 150   | 361    | 0       | 0.024   |
| 2  | 650  | 773  | 150   | 361    | 0       | 0.015   |
| 3  | 500  | 773  | 150   | 361    | 0       | 0.012   |
| 4  | 350  | 773  | 150   | 361    | 0       | 0.012   |
| 5  | 200  | 773  | 150   | 361    | 0       | 0.013   |
| 6  | 50   | 773  | 150   | 361    | 0       | 0.015   |
| 7  | 1094 | 280  | 351   | 361    | 0       | 0.016   |
| 8  | 800  | 280  | 150   | 361    | 0       | 0.13    |
| 9  | 650  | 280  | 150   | 361    | 0       | 0.12    |
| 10 | 500  | 280  | 150   | 361    | 0       | 0.1     |
| 11 | 350  | 280  | 150   | 361    | 0       | 0.1     |
| 12 | 200  | 280  | 150   | 361    | 0       | 0.1     |
| 13 | 50   | 280  | 150   | 361    | 0       | 0.1     |
| 14 | 1094 | 1270 | 351   | 361    | 0       | 0.015   |
| 15 | 800  | 1270 | 150   | 361    | 0       | 0.1     |
| 16 | 650  | 1270 | 150   | 361    | 0       | 0.1     |
| 17 | 500  | 1270 | 150   | 361    | 0       | 0.1     |
| 18 | 350  | 1270 | 150   | 361    | 0       | 0.1     |
| 19 | 200  | 1270 | 150   | 361    | 0       | 0.1     |
| 20 | 50   | 1270 | 150   | 361    | 0       | 0.1     |
| 21 | 1570 | 773  | 150   | 361    | 0       | 0.035   |
| 22 | 1720 | 773  | 150   | 361    | 0       | 0.02    |
| 23 | 1870 | 773  | 150   | 361    | 0       | 0.012   |
| 24 | 2020 | 773  | 150   | 361    | 0       | 0.012   |
| 25 | 2170 | 773  | 150   | 361    | 0       | 0.011   |
| 26 | 2320 | 773  | 150   | 361    | 0       | 0.013   |
| 27 | 1570 | 280  | 150   | 361    | 0       | 0.1     |
| 28 | 1720 | 280  | 150   | 361    | 0       | 0.1     |
| 29 | 1870 | 280  | 150   | 361    | 0       | 0.1     |
| 30 | 2020 | 280  | 150   | 361    | 0       | 0.1     |
| 31 | 2170 | 280  | 150   | 361    | 0       | 0.1     |
| 32 | 2320 | 280  | 150   | 361    | 0       | 0.1     |
| 33 | 1570 | 1270 | 150   | 361    | 0       | 0.1     |
| 34 | 1720 | 1270 | 150   | 361    | 0       | 0.1     |
| 35 | 1870 | 1270 | 150   | 361    | 0       | 0.1     |
| 36 | 2020 | 1270 | 150   | 361    | 0       | 0.1     |
| 37 | 2170 | 1270 | 150   | 361    | 0       | 0.1     |
| 38 | 2320 | 1270 | 150   | 361    | 0       | 0.1     |

FIG. 10

OPTICAL DEVICE TESTING METHOD AND APPARATUS

FIELD OF THE INVENTION

The present invention generally relates to optical testing, and in particular, it concerns testing optical devices.

BACKGROUND OF THE INVENTION

During the process of integration of an optical engine (optical element, "OE") in to various systems (for example, for augmented reality "AR" near eye display) there is a need to evaluate performance of the OE at both the component level and the integrated unit level. Specifically, because systems (such as AR) combine and transmit real and synthetic images into an observer's eyes, there is a need for specialized testing of smears, white lines, jumps, and black lines (gaps, areas of less intensity).

SUMMARY

According to the teachings of the present embodiment there is provided a method for testing an optical device, the method including the steps of: capturing an image at a first of a plurality of capture locations, the plurality of capture locations at an eye relief (ER) distance from a lightguide of the optical device and in an eye motion box (EMB) of the lightguide, the lightguide having: a first pair of external surfaces parallel to each other for guiding light by internal reflection, a coupling-in configuration for coupling an input image into the lightguide, and a coupling-out configuration for coupling the input image out of the lightguide as an output image, so as to be viewable by an eye of a user at the eye relief distance and viewable across an area referred to as the eye motion box, repeating the capturing an image at one or more additional locations of the plurality of capture locations, other than the first capture location, and deriving one or more metrics based on captured images from the first capture location and at least one of the additional capture locations.

In an optional embodiment, further including: projecting a collimated image of a test pattern into the lightguide via the coupling-in configuration, the lightguide including: at least one set of facets, each of the sets: including a plurality of partially reflecting facets parallel to each other, between the first pair of external surfaces, and at an oblique angle relative to the first pair of external surfaces, and the capturing an image being of an image projected from the lightguide.

In an optional embodiment, the lightguide includes a set of three optical components, said set including: a pair of first and second matching diffractive optical components; and a reflective optical component including a sequence of a plurality of partially reflective, mutually parallel surfaces; and said components cooperating for expanding coupled-in light to coupled-out light, said coupled-in light being light coupled into said at least one lightguide, and said expanding being two-dimensional.

In another optional embodiment, a first optical component of said set is configured for directing said coupled-in light in a first direction of expansion within a first lightguide, thereby generating first expanded light; a second optical component of said set is configured for coupling said first expanded light into a second lightguide in a second direction of expansion, thereby generating second expanded light; and a third optical component of said set configured for out-coupling said second expanded light in a third direction as said coupled-out light; wherein said first, second and third directions are non-parallel to each other.

In another optional embodiment, further including: a non-diffractive optical component configured to direct light into said at least one lightguide as said coupled-in light; wherein said at least one lightguide is one lightguide including: said first diffractive optical component configured for directing said coupled-in light in a first direction of expansion within said one lightguide, thereby generating first expanded light; said second diffractive optical component configured for expanding said first expanded light in said one lightguide in a second direction of expansion, thereby generating second expanded light; and said reflective optical component configured for out-coupling said second expanded light in a third direction as said coupled-out light; wherein said first, second and third directions are non-parallel to each other.

In another optional embodiment, further including: defining at least one region of interest in each of a plurality of the captured images, each the captured image: including a test pattern captured from the output light of the optical device, the output light generated by projecting a collimated image of the test pattern into the optical device, and captured at a different location within an active area of the optical device, relative to the optical device, the active area used by a user for viewing the output light, each region of interest including a portion of the test pattern, extracting a plurality of cross-sections from each of the at least one region of interest, wherein each of the plurality of cross-sections includes an area of the portion of the test pattern, thereby forming a corresponding set of cross-sections for each region of interest for each portion of the test pattern, and for each portion of the test pattern, comparing the corresponding sets of cross-sections to determine a metric for the optical device. Wherein a location of each cross-section of the set of cross-sections is known relative to other locations of other cross-sections of the set of cross-sections In another optional embodiment, further including defining, in the captured image, one or more additional fields, the captured image captured from output light of the optical device, the output light generated by projecting a collimated image of a test pattern into the optical device, and the optical device having: a first pair of external surfaces parallel to each other, and at least one set of facets, each of the set of facets: including a plurality of partially reflecting facets parallel to each other and at an oblique angle relative to the first pair of external surfaces, and between the first pair of external surfaces, and a direction of propagation: of the collimated image via the set of facets, internal to the optical device, and parallel to the first pair of external surfaces, each of the additional fields: being in an associated location within the captured image, the associated location being parallel to the direction of propagation, and having an associated brightness level, and deriving a metric based on at least one of the associated brightness levels.

In another optional embodiment, further including defining, in the captured image, one or more fields, the captured image captured from output light of an optical system, the optical system including: an optical device configured to propagate an input image and couple out the input image as the output light, an input coupling section configured for coupling the input image into the optical device, and a coupling interface being a location of an edge of an area at which the input coupling section is joined to the optical device, the output light generated by projecting a collimated image of a test pattern via the input coupling section into the optical device, and each of the one or more fields: being in an associated location within the captured image, the associated location being parallel to the coupling interface and deriving a metric based on at least one of the fields.

According to the teachings of the present embodiment there is provided a method for testing an optical device, the method including the steps of: defining at least one region of interest in each of a plurality of captured images, each the captured image: including a test pattern, captured from the output light of the optical device, the output light generated by projecting a collimated image of the test pattern into the optical device, and captured at a different location within an active area of the optical device, relative to the optical device, the active area used by a user for viewing the output light, each region of interest including a portion of the test pattern, extracting a plurality of cross-sections from each of the at least one region of interest, wherein each of the plurality of cross-sections includes an area of the portion of the test pattern, thereby forming a corresponding set of cross-sections for each region of interest for each portion of the test pattern, and for each portion of the test pattern, comparing the corresponding sets of cross-sections to determine a metric for the optical device.

In an optional embodiment, further including the step of: projecting a collimated image of the test pattern into a lightguide optical element (LOE) and capturing a plurality of images projected from the LOE to generate the plurality of captured images, the capturing of each image at a different the location relative to the optical device.

In another optional embodiment, wherein the capturing is by a camera moving orthogonal to an output surface of the LOE, the moving being within the active area that is used by a user for viewing the output light projected from the LOE.

In another optional embodiment, wherein the LOE includes an array of partially reflecting surfaces, each surface separated from an adjacent surface by a facet-spacing distance, the camera having an aperture set at the facet-spacing.

In another optional embodiment, wherein the at least one region of interest includes a first region of interest orthogonal to a second region of interest.

In another optional embodiment, wherein the test pattern is a cross-hair, the first region of interest is of a vertical portion of the cross-hair and the second region of interest is of a horizontal portion of the cross-hair.

In another optional embodiment, wherein for each region of interest the plurality of cross-sections is sequential in a direction from an origin of the test pattern to a point on an edge of the test pattern.

In another optional embodiment, wherein for each region of interest the plurality of cross sections are averaged with each other to generate a single averaged cross-section.

In another optional embodiment, wherein the metric is based on the location relative to the optical device. In another optional embodiment, wherein the metric is calculated from the cross-sections using a technique selected from the group consisting of:

(a) full width at half maximum (FWHM),
(b) mean peak width,
(c) standard deviation of peak width,
(d) first derivative of peaks widths,
(e) second derivative of peaks widths,
(f) largest peak width,
(g) max peak shift from expected location,
(h) standard deviation of peak shift,
(i) mean modulation transfer function at Nyquist frequency,
(j) mean modulation transfer function at a frequency other than Nyquist frequency,
(k) standard deviation of transfer function at Nyquist frequency, and
(l) standard deviation of transfer function at a frequency other than Nyquist frequency.

According to the teachings of the present embodiment there is provided a method for testing, the method including the steps of: defining, in a captured image, one or more additional fields, the captured image captured from output light of an optical device, the output light generated by projecting a collimated image of a test pattern into the optical device, and the optical device having: a first pair of external surfaces (926, 926A) parallel to each other, and at least one set of facets, each of the set of facets: including a plurality of partially reflecting facets parallel to each other and at an oblique angle relative to the first pair of external surfaces, and between the first pair of external surfaces (926, 926A), and a direction of propagation: of the collimated image via the set of facets, internal to the optical device, and parallel to the first pair of external surfaces, each of the additional fields: being in an associated location within the captured image, the associated location being parallel to the direction of propagation, and having an associated brightness level, and deriving a metric based on at least one of the associated brightness levels.

In an optional embodiment, further including the step of: projecting a collimated image of the test pattern into the optical device, the optical device being a lightguide optical element and capturing an image projected from the LOE to provide the captured image.

In another optional embodiment, wherein the capturing is by a camera at a first of a plurality of capture locations, the plurality of capture locations at an eye relief distance from the LOE and in an eye motion box of the LOE.

In another optional embodiment, wherein the capturing is repeated at one or more of the capture locations, other than the first capture location, and one or more additional metrics are derived based on the capture locations.

In another optional embodiment, further including defining, in a captured image, a first field, the first field: having a first brightness level, and being in a first location within the captured image, the first location other than the associated locations, wherein the metric is derived at least in part by comparing the first brightness level to one or more associated brightness levels.

In another optional embodiment, wherein the first field is a white square and the additional fields are portions of a black background surrounding the first field.

In another optional embodiment, wherein the first field is central to the captured image and the additional fields are adjacent to each other from the first field to left and right edges of the captured image.

In another optional embodiment, wherein each the associated brightness level is less than the first brightness level.

In another optional embodiment, wherein the first brightness level is at least substantially 100 times brighter than each the associated level.

In another optional embodiment, further including the step of: prior to the step of comparing, normalizing intensity of the captured image.

In another optional embodiment, wherein the first field includes a first area of the captured image, and the step of normalizing includes: projecting a collimated image of a second test pattern having substantially entirely the first brightness level, capturing a second captured image from the output light generated by the second test pattern, and determining a white-intensity using a technique selected from the group consisting of: measuring the average intensity of the first area in the second captured image, and measuring intensity of the second captured image, normalizing the captured image using the white intensity.

In another optional embodiment, wherein the step of normalizing further includes: projecting a collimated image of a third test pattern having substantially entirely one of the associated brightness levels, capturing a third captured image from the output light generated by the third test pattern, and determining a black-intensity by measuring intensity of the third captured image, normalizing the captured using differences between the white intensity and the black intensity.

In another optional embodiment, wherein the metric is determined using a technique selected from the group consisting of: comparing at least one the associated brightness level to at least one previously determined brightness level, summing the associated brightness levels, and comparing a second additional field's associated brightness level to two brightness levels each of additional fields adjacent to the second additional field and opposite each other.

In another optional embodiment, wherein a first and second of the additional fields are each adjacent to the first field.

In another optional embodiment, wherein the captured image is monochromatic and the brightness levels are a gray levels.

According to the teachings of the present embodiment there is provided a method for testing, the method including the steps of: defining, in a captured image, one or more fields, the captured image captured from output light of an optical system, the optical system including: an optical device configured to propagate an input image and couple out the input image as the output light, an input coupling section configured for coupling the input image into the optical device, and a coupling interface being a location of an edge of an area at which the input coupling section is joined to the optical device, the output light generated by projecting a collimated image of a test pattern via the input coupling section into the optical device, and each of the one or more fields: being in an associated location within the captured image, the associated location being parallel to the coupling interface and deriving a metric based on at least one of the fields.

In an optional embodiment, further including the step of: projecting a collimated image of the test pattern into the optical system, the optical system being a lightguide optical element and capturing an image projected by the output light from the LOE to provide the captured image.

In another optional embodiment, wherein the capturing is by a camera at a first of a plurality of capture locations, the plurality of capture locations at an eye relief distance from the LOE and in an eye motion box of the LOE.

In another optional embodiment, wherein the capturing is repeated at one or more of the capture locations, other than the first capture location, and one or more additional metrics are derived based on the capture locations.

In another optional embodiment, wherein the test pattern includes a first area having a first brightness level greater than a background brightness level of a background area, the background area being an area of the test pattern other than the first area.

In another optional embodiment, wherein the first area is white, the background area is black surrounding the first area, and the one or more fields are defined in the background area.

In another optional embodiment, wherein the first brightness level is at least substantially 200 times brighter than the background brightness level.

In another optional embodiment, further including the step of: prior to the step of deriving, normalizing intensity of the captured image.

In another optional embodiment, wherein the metric is determined using a technique selected from the group consisting of: comparing brightness levels within the one or more fields to at least one previously determined brightness level, summing brightness levels within the one or more fields, and comparing a first brightness level to at least one other brightness level within the one or more fields.

In another optional embodiment, wherein the captured image is monochromatic and brightness levels are gray levels.

In another optional embodiment, wherein the captured image has a high dynamic range of brightness levels.

According to the teachings of the present embodiment there is provided a non-transitory computer-readable storage medium having embedded thereon computer-readable code for testing an optical device, the computer-readable code including program code for the steps of this description.

BRIEF DESCRIPTION OF FIGURES

The embodiment is herein described, by way of example only, with reference to the accompanying drawings, wherein:

FIG. 4A, there is shown a plurality of captured images.

FIG. 4B, there is shown regions of interest.

FIG. 4C, there is shown extraction of cross sections from regions of interest.

FIG. 10, there is shown a chart of the 39 fields F0 to F38 position, size, and brightness intensity.

DETAILED DESCRIPTION—FIG. 1 TO FIG. 19

The principles and operation of the system and method according to a present embodiment may be better understood with reference to the drawings and the accompanying description. A present invention is a system and method for optical testing along a specific axis for evaluation of LOE transfer function uniformity across facet's active area. The existence and degree of "smearing" of a projected image from an optical device can be detected, where "smearing" generally refers to the generation and propagation of other than the primary light rays of an image, resulting in a projection of an image outline to a well-defined direction. The existence and degree of a "white stripes" (WS) phenomenon related to scattering and diffraction in the wedge-to-LOE interface can be detected.

Figure 1:
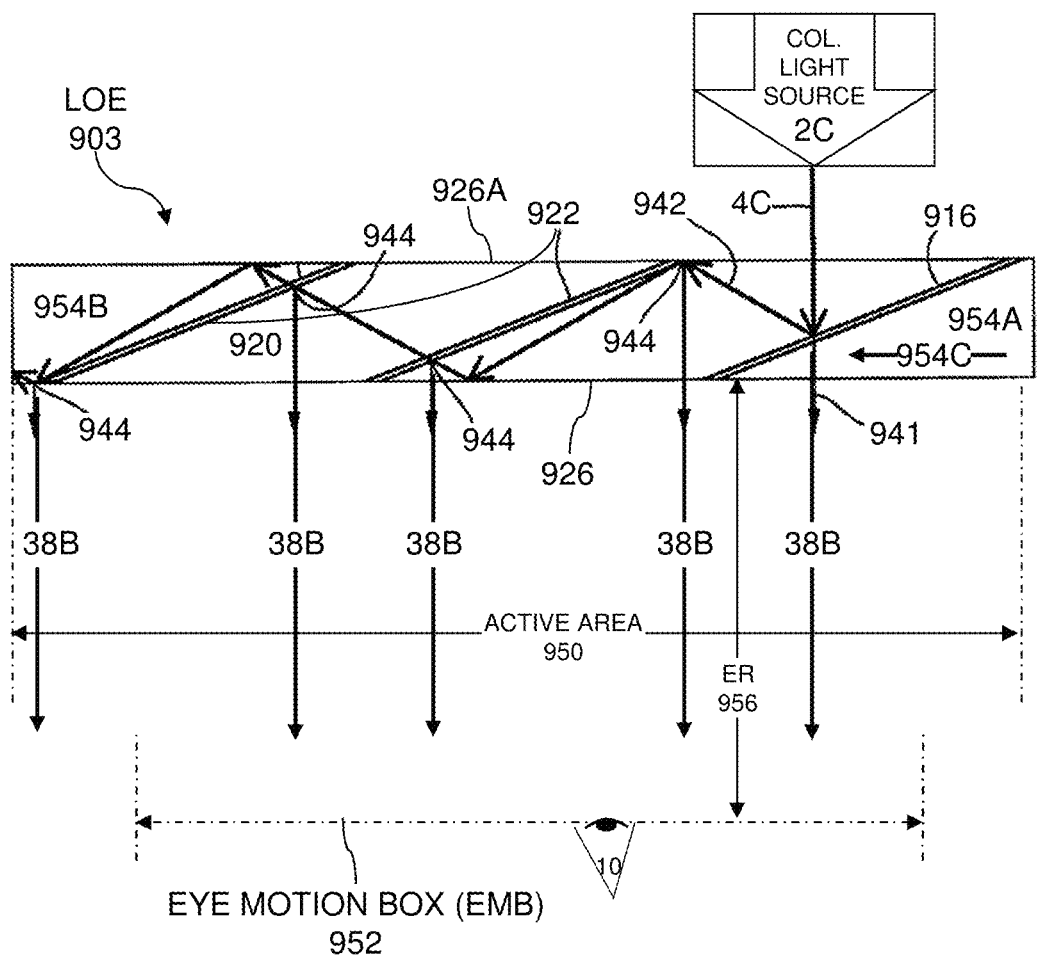
FIG. 1, there is shown a side view of an exemplary lightguide optical element (LOE).

Basic Technology—FIG. 1

Referring to FIG. 1, there is shown a side view of an exemplary lightguide optical element (LOE) 903. The current figure is not drawn to scale. A collimated light source 2C emanates a collimated input beam 4C. In the context of this document, light sources are also referred to as "projectors." Light sources can be lasers or an LED that transmits a single or plurality of wavelengths. The light has a plurality of angular propagation directions that are oriented around the axis of the transmission, such as in a lightguide. For simplicity in the current figures, generally only the center direction of propagation is depicted for clarity. Only one light ray is generally depicted, the incoming light ray, the input beam (for example the collimated input beam 4C), also referred to as the "beam" or the "incoming ray". Generally, wherever an image is represented herein by a light beam, it should be noted that the beam is a sample beam of the image, which typically is formed by multiple beams at slightly differing angles each corresponding to a point or pixel of the image. Except where specifically referred to as an extremity of the image, the beams illustrated are typically a centroid of the image. That is, the light corresponds to an image and the central ray is a center ray from a center of the image or a central pixel of the image.

A first reflecting surface 916 is illuminated by the collimated input beam 4C. A first region 954A (proximal end) is proximal to the collimated input beam 4C where an image illumination (input image) is coupled into a lightguide 920. The reflecting surface 916 at least partially reflects the incident light of the collimated input beam 4C from the collimated light source 2C such that the light is trapped inside the lightguide 920 by internal reflection, typically total internal reflection (TIR). The lightguide 920 is typically a transparent substrate, and is also referred to as a "planar substrate", "light-transmitting substrate", and "waveguide". The lightguide 920 includes at least two (major, external) surfaces, typically parallel to each other (mutually parallel), shown in the current figure as a first (back, major) surface 926 and a front (second, major) surface 926A. Note that the designation of "front" and "back" with regard to the major surfaces (926, 926A) is for convenience of reference. Coupling-in to the lightguide 920 can be from various surfaces, such as the front, back, side edge, or any other desired coupling-in geometry.

The collimated input beam 4C enters the lightguide substrate at a proximal end of the substrate (right side of the figure). Light propagates 954C through the lightguide 920 from the first region 954A through one or more facets, normally at least a plurality of facets, and typically several facets, toward a distal end 954B of the lightguide 920 (left side of the figure). The lightguide 920 typically guides rays of propagating light in the substrate by internal reflection of the external surfaces.

After optionally reflecting off the internal surfaces of the substrate 920, the trapped waves reach a set (array) of selectively reflecting (partially reflecting) surfaces (facets) 922, which couple the light out of the substrate into the eye 10 of a viewer. In the current exemplary figure, the trapped ray is gradually coupled out from the substrate 920 by two other partially reflecting surfaces 922 at the points 944, each of the facets coupling out a portion of the propagating light. Several exemplary coupled-out rays are shown as out-coupling rays 38B. The out-coupled rays 38B define an active area 950 on the surface of the LOE 903 where the input image of the collimated input beam 4C is output as an output image. A field of view (FOV) (not shown) for the viewer's eye 10 defines an angular range seen by a user's eye. A specific distance of the user's eye 10 from the LOE 903 (for example 18 mm) is referred to as an eye relief (ER) distance 956. An eye motion box (EMB) 952 is an area (two-dimensional) via which the viewer's eye 10 has a full FOV of the active area 950 projecting the entire input image coupled into the LOE 903, when the user's eye 10 is at the eye relief distance 956. In other words, the EMB 952 is a two-dimensional (2D) area at the ER distance 956, at which the user's eye 10 captures the entire image (full FOV) projected by the LOE 903. Internal, partially reflecting surfaces, such as the set of selectively reflecting surfaces 922 are generally referred to in the context of this document as "facets." For applications such as augmented reality, the facets are partially reflecting, allowing light from the real world to enter via the front surface 926A, traverse the substrate including facets, and exit the substrate via the back surface 926 to the eye 10 of the viewer. Exemplary ray 942 shows light of the collimated input beam 4C partially reflected from reflecting surface 916, and exemplary ray 941 shows light of the collimated input beam 4C partially transmitted through reflecting surface 916.

The internal partially reflecting surfaces 922 generally at least partially traverse the lightguide 920 at an oblique angle (i.e., non-parallel, neither parallel nor perpendicular) to the direction of elongation of the lightguide 920. Partial reflection can be implemented by a variety of techniques, including, but not limited to transmission of a percentage of light, or use of polarization.

The lightguide 920 optionally has a second pair of external surfaces (not shown in the current figure side view) parallel to each other and non-parallel to the first pair of external surfaces. In some implementations, the second pair of external surfaces is perpendicular to the first pair of external surfaces. Typically, each of the facets is at an oblique angle to the second pair of external surfaces. In other cases, where reflections from peripheral surfaces of the lightguide are not desired, the peripheral surfaces are typically left unpolished and/or coated with light absorbent (e.g., black) material to minimize undesired reflections.

Figure 2:
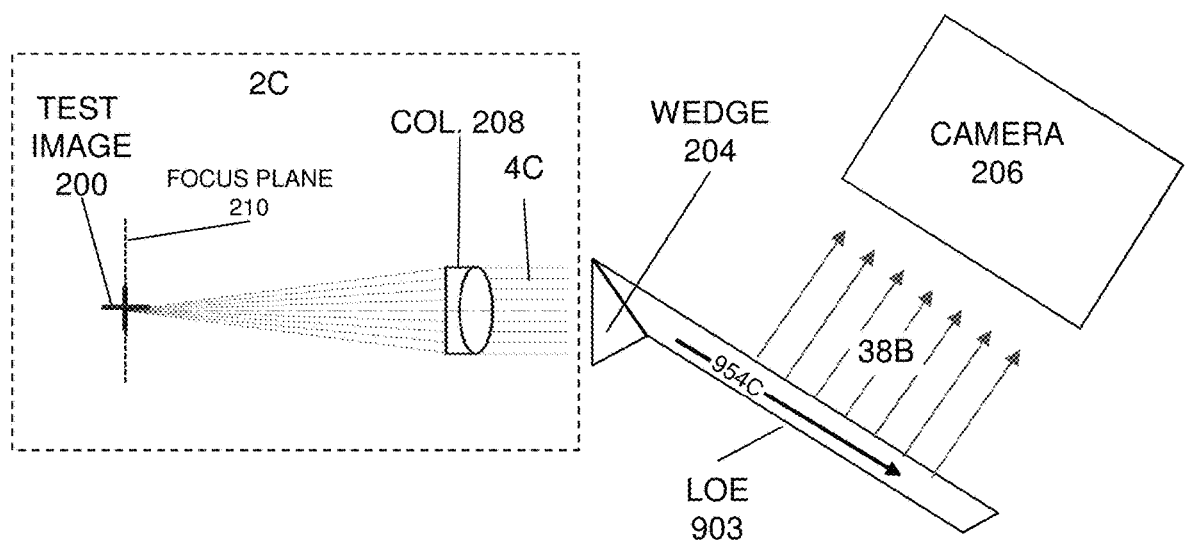
FIG. 2, there is shown a basic, common test setup system.

Test Setup—FIG. 2

Referring to FIG. 2, there is shown a basic, common test setup system that can be used for the below-described optical testing. In the current figure, the collimated light source 2C is implemented by a first exemplary light source system 202C that includes a projected test pattern 200, in this case a reticle (reticule) in the shape of a "cross-hair" at a focus plane 210. The test pattern 200 is projected via a collimator 208 to produce collimated input beam 4C. The collimated input beam 4C is input via a wedge 204 to the LOE 903 where the image propagates 954C through the LOE 903 and is coupled out by the array of selectively facets 922 (not shown) as the out-coupling rays 38B toward a camera 206.

A typical implementation is described wherein the LOE 903 includes the array of selectively facets 922, however, this is not limiting. The LOE 903 can alternatively include a single facet, or a different combination of facets that are not parallel to one another. One alternative implementation is to use in place of the LOE 903 a lightguide using and/or combining facet reflective technology (reflective components) and diffractive technology (diffractive components), such as disclosed in PCT/IL2018/050205 to Lumus LTD. Embodiments with diffractive components use at least two components having opposite optical power (matching), so that chromatic dispersion introduced by a first diffractive component will then be cancelled by a second diffractive component. The two diffractive components can be used in combination with a reflective optical component to achieve aperture expansion (for near eye display).

The use of the wedge 204 is a non-limiting example of an input coupling section, and other devices and configuration can be used to couple the image into the LOE 903. Similarly, the camera 206 is a non-limiting example of a typical implementation, and various configurations of image capture devices can be used to implement the requirements for specific applications and testing.

In addition, the hardware setup for testing should be in a clean room of an appropriate level, and external light should be managed, such as ambient room light and blocking light from entering the LOE 903 from other directions (other than the desired in-coupled test beam) such as blocking light from entering the back side of the LOE 903.

First Embodiment—FIG. 3A to FIG. 5

The principles and operation of the system and method according to a present embodiment may be better understood with reference to the drawings and the accompanying description. A present invention is a system and method for optical testing along a specific axis for evaluation of LOE transfer function uniformity across facet's active area.

In this description, the non-limiting examples of an augmented reality (AR) application implemented with an LOE (lightguide optical element) 903, using a test pattern in the shape of a "cross-hair" are used for simplicity. This exemplary implementation is non-limiting, and other optical devices and test patterns (other shapes of test patterns) can be used, for example, horizontal thin lines, small dots, or slant edge.

In an LOE 903 based augmented reality optical engine, there is symmetry breaking between the horizontal and vertical directions in the optical design, resulting in a need for specialized testing along a specific axis. In particular, an axis in the direction (954C) of the array of facets 922 in the light-transmitting substrate 920. In a case of a component level test system for the LOE 903, the optical performance of the LOE needs to be uniform across the facet's (or LOE's) active area 950.

Figure 3A:
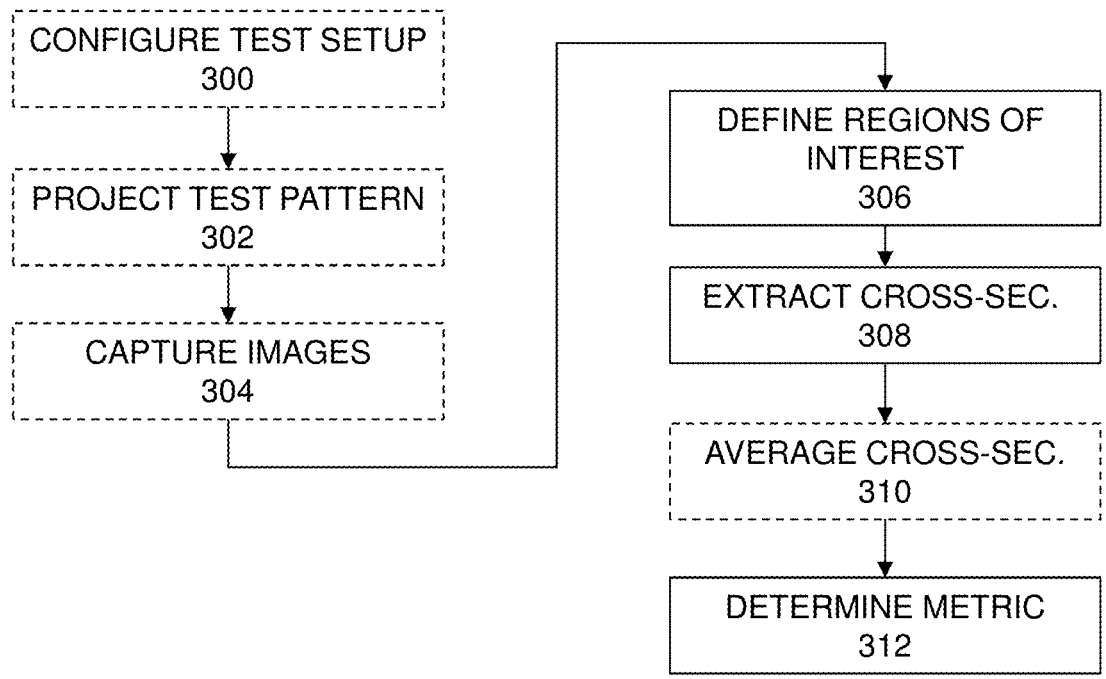
FIG. 3A, there is shown a flowchart for optical testing along a specific axis.

Referring to FIG. 3A, there is shown a flowchart for optical testing along a specific axis. In step 300, a test setup is configured as described in the following section.

Figure 3B:
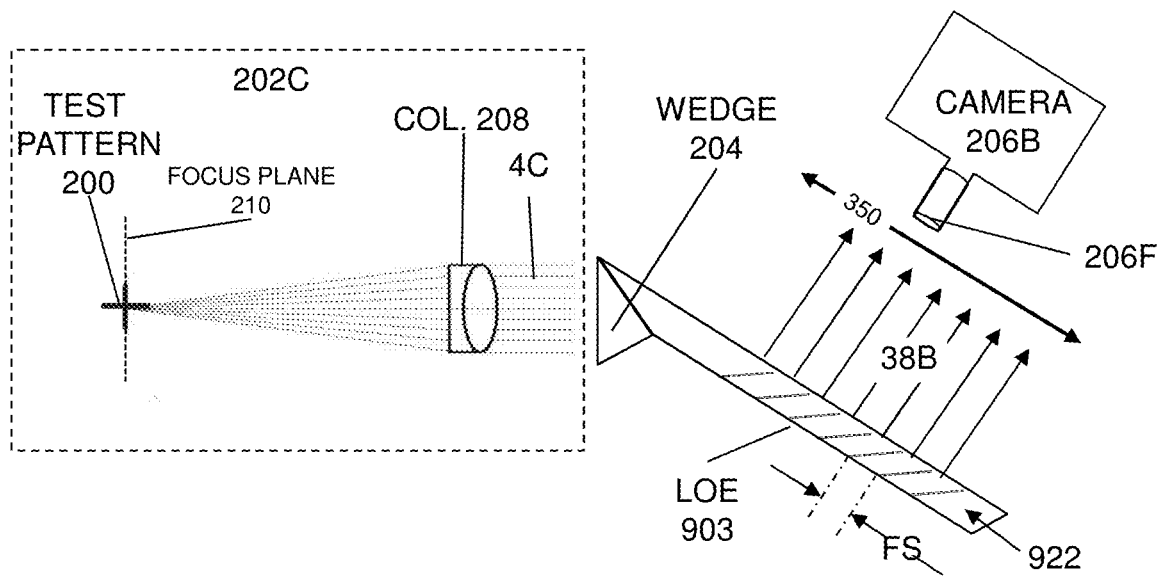
FIG. 3B, there is shown a test setup system for the testing method of the current embodiment.

Referring also to FIG. 3B, there is shown a test setup system for the testing method of the current embodiment. The evaluation of the LOE transfer function uniformity across the facet's 922 active area 950 requires a specialized test setup that injects a test signal. An exemplary test signal is a wavefront (spatial impulse function) into the LOE 903 via the entrance aperture.

In step 302, a test pattern is projected. One technique for achieving this in practice is by projection of the test pattern 200 (for example, a cross, or cross-hair pattern) from a collimator (autocollimator) through the wedge 204 (perpendicularly) which is then repeatedly reflected by the facets 922 of the LOE 903. The input from the collimator can be in various directions relative to the input coupling wedge. For example, 90 degrees (the test pattern is input perpendicular to the surface of the wedge 204) will test the center of observer's field of view but off-angle (other than 90 degrees, for example 30 degrees from normal to the wedge surface) inputs can be used to test other angles of propagation through the LOE 903 corresponding to different points in the observer's field of view.

In step 304, images are captured. In order to evaluate the LOE transfer function across the facet's active area (along both horizontal and vertical axes), a camera 206B positioned opposite the LOE 903 scans the projected image from the LOE and the image data of the cross-hair (test pattern) is digitized as a function of position. The camera 206B has an aperture 206F. A distance between adjacent facets is defined as a facet spacing (FS) distance. The scan can be done, and the images captured in a variety of patterns, as long as the processing knows the position of each captured image so the images can be processed correctly, in particular with relation to each other. After an initial scan and capturing of images, the scan can be repeated in full or partially to capture images at a different spacing and/or locations, for example, to do a finer scan between two particular facets. Typically, the camera 206B moves orthogonally to the facets 922 (as shown by arrow 350), capturing many images (a plurality of images) as the camera 206B moves across the array of facets 922.

A preferable, non-limiting implementation is to use a camera aperture that matches the facet spacing. For example, if the facet spacing (FS) is 3 mm (millimeter), then the camera aperture can be set for 3 mm. If the camera aperture is greater or less than the facet spacing FS, then on skilled in the art will need to adjust this procedure accordingly. Images are captured at known intervals, for example, every 1 (one) mm or every 0.5 mm. Decreased intervals can be used for higher resolution. In general, the camera aperture 206F should be large enough to receive cross images from two adjacent facets, but not from three adjacent facets. A jump in location of the test pattern can indicate unparallel facets. A standard round aperture can be used. Other requirements for specific applications may use a more complicated shaped aperture. The camera 206B is preferably positioned so the test pattern (cross-hair) appears in the center of the captured image. This fixes the correct angle with respect to the LOE 903. Regarding the translation alignment, the camera 206B is placed more or less in front of the center of the LOE 903. The test is not sensitive to the exact location of the camera 206B with respect to the LOE 903.

The depth and resolution of the captured image, that is, the number of bits per pixel and number of pixels should be appropriate for the desired testing accuracy and precision.

For example, 8-bits gray-scale (monochromatic camera) is generally sufficient for the current level of testing. The lens and pixel size are preferably such that the width of the imaged test pattern (for a specific slit size and autocollimator lens) will be at least several pixels.

As the input to the LOE 903 is a collimated image of a test pattern (the collimated input beam 4C), the output from the LOE (out-coupling rays 38B) at each location in the active area 950 of the LOE 903 is going to be the collimated image of the test pattern. Testing is for non-uniformities in the output collimated image of the test pattern from the LOE. Each pixel of the test pattern 200 corresponds to an angle in space, as the test pattern appears to be coming from infinity at each point in the active area 950 of the output of the LOE.

Referring to FIG. 4A there is shown a plurality of captured images. Exemplary captured images 410, including four images 410A, 410B, 410C, and 410D. Each captured image includes the projected test pattern 200, and each captured image has a location relative to the optical device being tested (in this case LOE 903).

Referring to FIG. 4B there is shown regions of interest. In step 306, in each image 410, there is defined at least one region of interest (ROI) that will be used for analysis. In a preferred embodiment, the at least one region of interest includes a first region of interest orthogonal to a second region of interest. In the current figure, the region of interest is shown as exemplary first ROI 400A and second ROI 400B. Each ROI includes a portion of the test pattern 200. In the current non-limiting exemplary implementation, the test pattern 200 is a cross-hair, the first ROI 400A is of a vertical portion of the cross-hair and the second ROI 400B is of a horizontal portion of the cross-hair. Each ROI refers to an area originating in the focus plane 210 of the test pattern 200. Each axis of the cross-hair test pattern 200 can provide different information. The cross-hair vertical line can be used for reference, since the vertical line will not suffer from jumps caused by the facets. The cross-hair horizontal cross line will suffer from broadening due to unparallel facets.

Referring to FIG. 4C, there is shown extraction of cross sections from regions of interest. In step 308, in overview, a plurality of cross-sections are extracted from each of the at least one region of interest. Each of the plurality of cross-sections includes a portion of the test pattern, thereby forming a corresponding set of cross-sections for each region of interest for each portion of the test pattern. A location of each cross-section of the set of cross-sections is known relative to other locations of other cross-sections of the set of cross-sections. In one implementation, in each region of interest the plurality of cross-sections are sequential in a direction from an origin of the test pattern to a point on an edge of the test pattern.

In the context of this embodiment, the term "cross-section" generally refers to extracting or measuring a one-dimensional trace of intensity from the two-dimensional (2D) image of the test pattern. The cross-section is an intensity trace measuring intensity of captured light along a line segment, the line segment including a sub-segment of the intensity of a portion of the test pattern. Thus, the intensity trace shows variation of intensity, giving a linear intensity profile of a sub-section (sub-image) of the captured image.

Now in more detail, for each of the captured images 410, digitized cross-sections are grabbed (extracted from) within one or more regions of interest. Captured image 410A is used in the current figure and will be used for clarity in the following description. For example the first ROI 400A includes exemplary horizontal cross sections 420A (also referred to in this document as "X cross-section", including 420AH1, 420AH2, and 420AH3). The second ROI 400B includes exemplary vertical cross sections 430A (also referred to in this document as "Y cross-section", including 430AV1, 430AV2, and 430AV3). Each of the plurality of cross-sections includes an area of the portion of the test pattern 200. In this case, cross-section 420AH3 includes area 420AH3A of test pattern 200. Similarly, cross-section 420AH2 includes 420AH2A, cross-section 420AH3 includes 420AH3A, cross-section 430AV1 includes 430AV1A, cross-section 430AV2 includes 430AV2A, and cross-section 430AV3 includes 430AV3A.

Exemplary cross sections 420AH1, 420AH2, and 420AH3 form a corresponding set 420A of cross-sections for ROI 400A of the test pattern 200. Similarly, exemplary cross sections 430AV1, 430AV2, and 430AV3 form a corresponding set 430A of cross-sections for ROI 400B of the test pattern 200.

In step 310, optionally the sets of cross-sections can be averaged. To allow a better signal to noise ratio, (within each ROI) each set of these cross-sections are projected or averaged with each other to form a single X-cross-section and a single Y-cross-section for each image. In the current example, the set 420A of cross-sections are averaged to generate an averaged horizontal cross-section 420AH with (averaged) area 420AHA. Similarly, the set 430A of cross-sections are averaged to generate an averaged vertical cross-section 420AV with (averaged) area 420AVA.

Based on the above description, if we would consider the captured image 410B, a similar set of cross-sections could be extracted (not shown). For example, from the captured image 410B a first ROI 400A and second ROI 400B are defined, corresponding to the same regions of interest in captured image 410A. A set of X-cross-sections 420B could include several exemplary cross-sections 420BH1, 420BH2, and 420BH3 used to produce averaged cross-section 420BH, while a set of Y-cross-sections 430B could include exemplary cross-sections 430BV1, 430BV2, and 430BV3 and used to produce averaged cross-section 430BV.

Similarly, the captured image 410C can be processed to produce from the first ROI 400A averaged cross-section 420CH, and from the second ROI 400B averaged cross-section 430CV.

Figure 5:
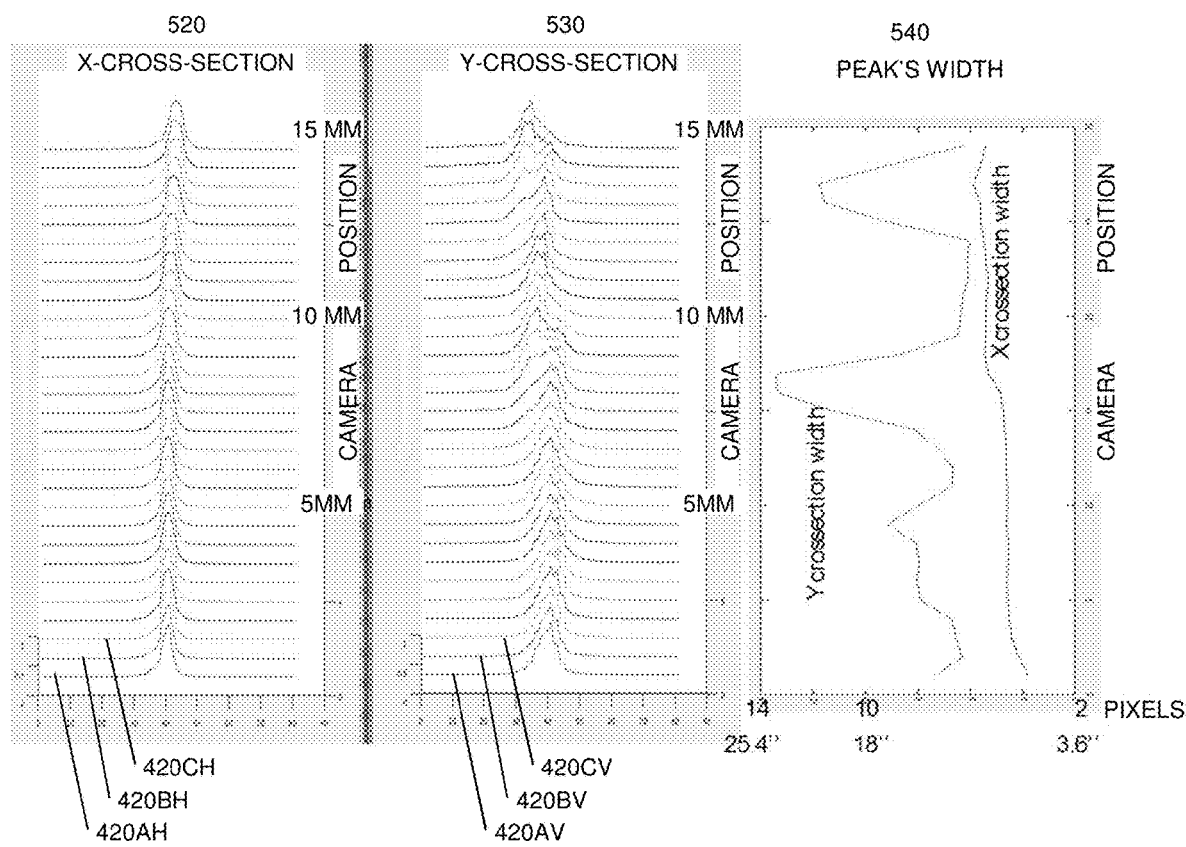
FIG. 5, there is shown scans of cross-sections and derived metrics

Referring now to FIG. 5, there is shown scans of cross-sections and derived metrics. X-cross-section scan 520 shows a scan of averaged cross-sections as a function of camera position. Exemplary average cross-sections 420AH, 420BH, 420CH are stacked vertically in the scan with the vertical axis of the scan being camera position in millimeters (mm). Similarly, Y-cross-section scan 530 shows a scan of averaged cross-sections as a function of camera position. Exemplary average cross-sections 420AV, 420BV, 420CV are stacked vertically in the scan with the vertical axis of the scan being camera position in millimeters (mm). The measurement of camera position for each of the scans (520, 530) is a location of the camera 206B relative to the optical device, in this case relative the active area 950 of the LOE 903.

In step 312, metrics are determined based on the extracted cross-sections. The cross-sections (X-cross-sections 420AH, 420BH, 420CH, etc. and Y-cross-sections 430AV, 430BV, 430CV, etc.) for each ROI can now be further analyzed in order to calculate and estimate a number of performance metrics. Typically, the metric is based on a location relative to the optical device (location of the captured image relative to the active area of the optical device, from which the portion of the metric is derived). In one embodiment, the full width at half maximum (FWHM) of each averaged cross-section is calculated and plotted 540 as function of facet's active area location (camera position in the active area). The growth in the width of each peak of the FWHM plot can indicate bad LOE functionality (such as jumps, defocusing and energy loss). A number of other metrics can be extracted from the data, including but not limited to mean peak width, standard deviation of peak width, first and second derivatives of peaks widths, largest peak width, max peak shift from expected location, standard deviation of peak shift, mean modulation transfer function at Nyquist frequency or any other frequency, standard deviation of transfer function at Nyquist frequency or any other frequency.

For each portion of the test pattern 200, corresponding sets of cross-sections are compared to determine a metric for the optical device. Additional comparisons can be done, for example using the mean values of the sequence of FWHM (or other functions) for both the vertical and horizontal cross-sections.

In a further embodiment, the scanning and image capture is repeated for multiple wavelengths or multiple polarization states of the illumination (input beam 4C) or collection (out-coupling rays 38B). This can be achieved by introducing a tunable filter or rotating polarizer in either the illumination or collection path of the system.

Method steps 300, 302, and 304 are optional, as configuring the test setup, projecting the test pattern, and capturing images can be done independent of the processing of the captured images. Similarly, preparation, pre-processing, and optional processing of data, such as the step 310 of averaging the cross-sections, are optional processing that can be performed Second Embodiment—FIG. 6 to FIG. 11

A present embodiment is a system and method for detecting the existence and degree of "smearing" of a projected image from an optical device. In the context of this embodiment, the term "smear" or "smearing" generally refers to the generation and propagation of other than the primary light rays of an image, resulting in a projection of an image outline. The unwanted projection is to a well-defined direction or directions.

In an exemplary case where an optical device is an LOE 903, a direction of propagation 954C for the LOE 903 is of a collimated input image propagating via internal facets. Conventional optical devices produce a "haze" around the bright areas of an input image, that is, the smearing is substantially uniform in all directions around the bright area. In contrast, the scattering, or smearing in devices of the current embodiment, will be in a well-defined direction (for example, relative the LOE 903). Alternatively, the smear can be thought of as being added to, or "on top of" the haze, or having aspects of haze, but with sharp boundaries. Specifically, the smearing will be in a direction parallel to the direction of propagation, or more technically in a direction perpendicular to the cemented join lines of the array of facets. The rays causing the smear are defined not by the direction of the original light (direction of light of the impute image), but by the direction of the facet cement line. The light propagating inside the LOE 903 is not always perpendicular to the facets 922. More technically, only the rays that form a narrow horizontal line in the eye are perpendicular to the facets 922. All other rays would have a different angle so that the user's eye 10 sees the other rays as coming from above or below the horizon. Smears are therefore in a direction perpendicular to the direction of the facet lines (or facet cement line).

To detect and define the smearing, a feature of the current embodiment is defining one or more fields in a captured image (captured from the output of the LOE 903), each of the fields being parallel to the direction of propagation within the LOE 903. A feature of the current embodiment is characterization of the smears (in a defined direction), in contrast to characterizing general haze of an optical system.

Figure 8:
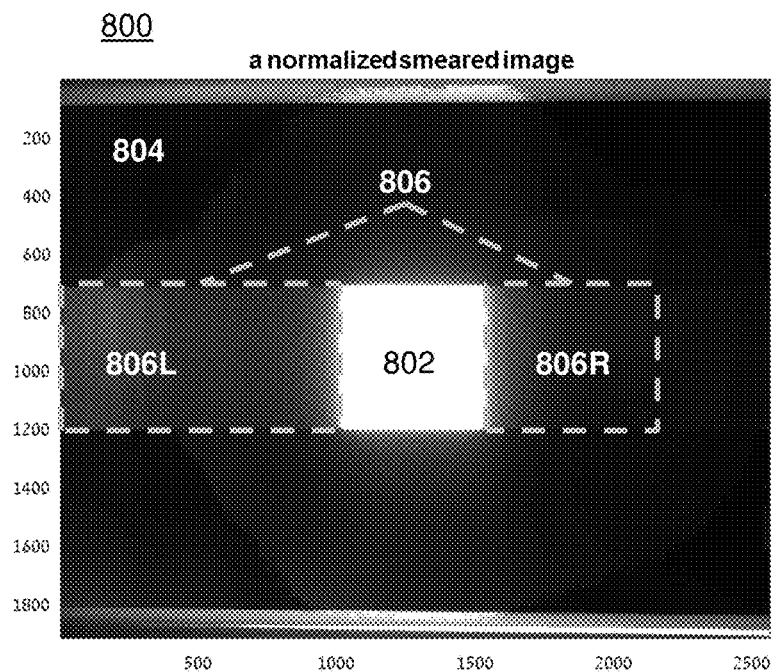
FIG. 8, there is shown a captured image of output from an optical device showing a white square main image on a black background.

Referring to FIG. 8, there is shown a captured image 800 of output from an optical device showing a white square main image 802 on a black background 804. Smearing 806 of the white square main image 802 can be seen primarily to the left of the main image as a left smear 806L and also to the right of the main image as a right smear 806R.

Figure 6:
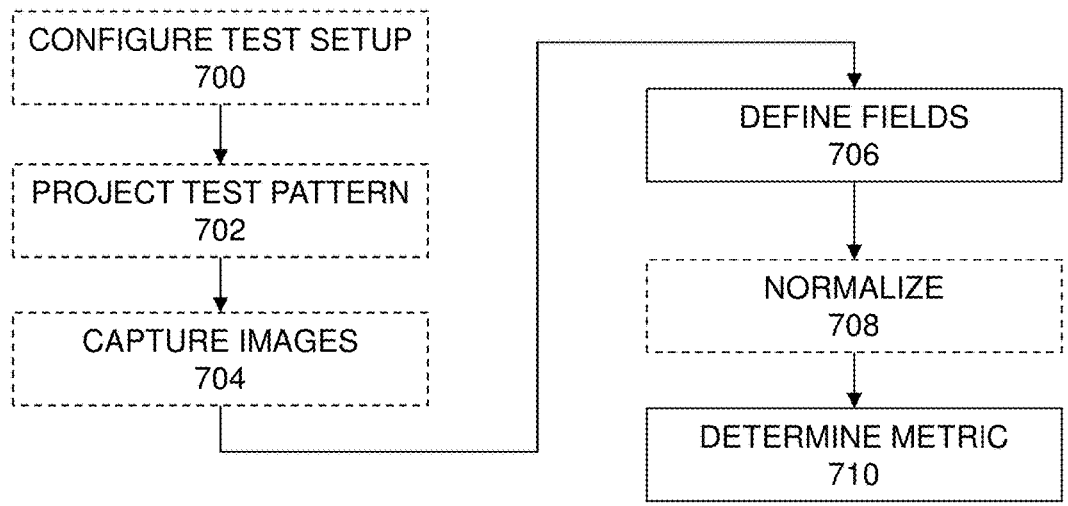
FIG. 6, there is shown a flowchart for optical testing of smearing.

Referring to FIG. 6, there is shown a flowchart for optical testing of smearing. In step 700, a test setup is configured as described in the following section.

Figure 7:
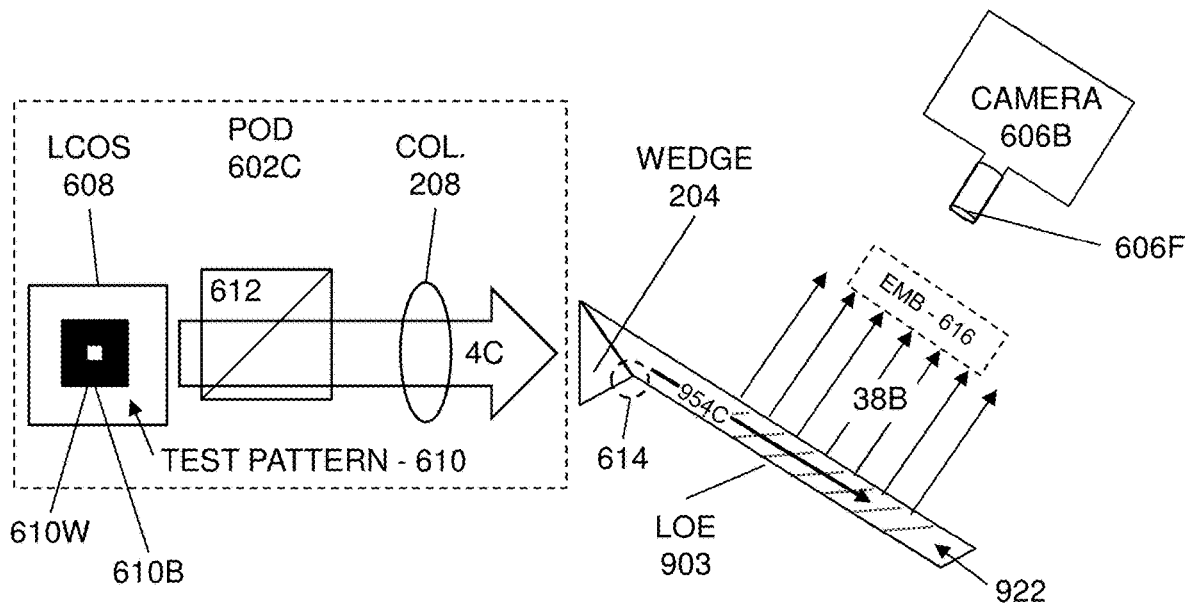
FIG. 7, there is shown an exemplary test setup system for the testing method of the current embodiment.

Referring also to FIG. 7, there is shown an exemplary test setup system for the testing method of the current embodiment. The evaluation of LOE 903 transfer function uniformity (projected output) across the facet's 922 active area 950 requires a specialized test setup that injects a test signal. The current test setup uses a "POD" (micro-display projector) 602C as the collimated light source 2C. An exemplary test signal is a wavefront (spatial impulse function) into the LOE 903 via the entrance aperture. A light source (not shown) provides uncollimated light via a polarized beam splitter 612 to a liquid crystal on silicon (LCOS) matrix 608. The LCOS 612 generates a test pattern 610 as reflected light that is collimated by collimator 208 to generate collimated input beam 4C. The exemplary first test pattern 610 is a white square 610W on a black background 610B. The collimated input beam is coupled by exemplary wedge 204 into the LOE 903. Other means, devices, and angles can be used to couple the collimated input beam 4C as an input image to the LOE 903. The input beam image is then repeatedly reflected by the facets 922 of the LOE 903 and coupled out of the LOE 903 as the out-coupled rays 38B.

A wedge-to-LOE interface 614 is shown in a dashed circle. The wedge-to-LOE interface is an edge of a location at which the input coupling section meets the lightguide substrate 920, in this implementation where the wedge 204 meets the LOE 903, in the optical path. In the current figure, this interface is an edge (line) "into" the page, where the wedge 204 and LOE 903 are connected.

Lumus optical engines (OEs) (by Lumus LTD, Ness Ziona, Israel) are generally designed for a specific distance of the user's eye 10 from the LOE 903 (for example 18 mm). This specific distance is referred to as the eye relief distance. An eye motion box (EMB) 616 (similar to the EMB 952) is the region within the entire field of view (FOV) that is observed by the user's eye 10, when the user's eye 10 is at the eye relief distance. A camera 606B having a lens 606F is used to capture an image of the out-coupling rays 38B. The camera 606B should be positioned in the EMB 616 so that the entrance pupil of the lens 606F will be at the eye relief distance.

For simplicity in this description, a non-limiting implementation of a monochromatic camera is used. The monochromatic camera captures the intensity (brightness level) of the projected image (out-coupling rays 38B), and will be expressed using an 8-bit scale of 0 (zero) to 255, where 0 is no light, or black, and 255 is maximum light, or all white. If a color camera is used, the brightness levels of the various colors (i.e. red, green, blue) should be taken into account.

In step 702, a test pattern is projected. Test patterns can be created with the active LCoS dimensions. In the current embodiment, a non-limiting example of an LCOS with dimensions of 1280×720 pixels is used. In the current embodiment, three test patterns are used. In the current figure, a first test pattern 610 is a white square 610W on a black background 610B, also referred to as a "center square" test pattern. Two other test patterns that are used are a "white slide" or "white background" which is a uniform image with brightness level of 255 (white) and a "black slide" or "black background" which is a uniform image with brightness level of 0 (black).

Given a test pattern with light-colored and dark-colored areas, the light-colored areas are from input light of the input beam 4C, and dark-colored areas are from the lack of input light. During propagation 954C through the LOE 903, the light will scatter from the light-colored area to the dark-colored area. In the current example, this scattering, or smearing, is from the white square 610W to the black background 610B. In other words, the white (light) scatters into the black (areas with no light). The intensity (brightness) of the input light color is significant, as opposed to the color of the light, so the use of "gray scale" or "brightness level" is used to quantify intensity of portions (fields) of the captured image 800 of the test pattern. The lighter brightness level light will scatter (smear) into the darker brightness level portions of the test pattern.

The input light of the input beam 4C must be bright enough to get sufficient visibility of scattering. While any color light can be used, such as red, green, or blue, white is preferred as giving the best contrast as compared to areas without light (black). If two intermediate brightness levels are used (as opposed to black and white) light will scatter from each gray area to the other gray area—the brighter gray area will scatter more light to the darker gray area. Experiments for a typical, currently produced LOE 903 implementation is that the scattered light is usually <1% of the source. In this case the contrast ratio (brightness ratio in this case) between the two areas (two brightness levels) should be at least 1/100 to be able to detect a bad signal to noise ratio (SNR) between the desired image and unwanted projection (smear). In other words, the two brightness levels should have a ratio of at least 1/100 to detect smearing.

Various test patterns can be used, each providing different features.

- A test pattern with high brightness in a large area has more light to scatter, but less black areas to detect smears or white stripes. Smears and white stripes will be strong compared to the input signal, but ghost images (~1% of the white intensity, regardless of the brightness) cover more of the black area (noise). Also, if the black area is small, there is less area in which to measure smears. If there are ghost images in the system, the ghost images will cover more of the FOV, as the white area is larger. The ghost images interfere with the smears and white stripes and make the measurement less accurate.
- A test pattern with high brightness in a small area will result in strong smears and white stripes, and the ghost images will cover only a small area of the captured image (typically still ~1% of the white intensity).
- A test pattern with a white filed that is not bright will result in less (fewer) smears and white stripes.
- A test pattern that is gray will result in fewer smears and less white stripes.
- A test pattern in which the black areas are actually gray (low level of input light, for example a brightness level of 39) will result in smears and white stripes not being observable, or very difficult to observe.

While various bright shapes can be used, preferably most of the area should be black to allow detection of the smears. If the black areas are not substantially black, that is, if the black area has a brightness level other than 0 (zero), the higher the brightness level, the more loss of visibility and accuracy in the measurement.

In step 704, images are captured. In order to evaluate the LOE transfer function across the facet's active area (along both horizontal and vertical axes), a camera 606B positioned opposite the LOE 903 captures an image of the out-coupling rays 38B from the test pattern 610. Preferably, the camera 606B should be positioned at the eye relief distance so the test measurement corresponds to the EMB 616 of the user.

In the current embodiment exemplary test setup system, the following parameters will be used for simplicity and clarity of description. Depending on the specific requirements for optical testing of an optical device, based on this description one skilled in the art will be able to determine the appropriate parameters for testing.

The first test pattern 610 is a white square 610W on a black background 610B. A combination of the camera 606B, lens 606F, and mechanics (not shown) are used for positioning of the entrance pupil of the camera (entrance of the lens 606F) at the eye relief distance and at the EMB center. The camera 606B should have a resolution enabling sufficient sampling of single LCoS pixels, typically a resolution of two camera pixels for each LCoS pixel in each dimension).

An example is a 12 mm focal length lens mounted on a monochromatic camera with a 2560×1920 array of 2.2 μm square pixels, giving a total sensor size of 5.63 mm by 4.22 mm. This combination allows capturing of a 26.5°×15.0° FOV (field of view) and projecting every LCoS pixel onto an area of 2.6×2.6 camera pixels. The edges of the FOV are not captured with this optical setup, but fields of interest are captured.

Figure 9:
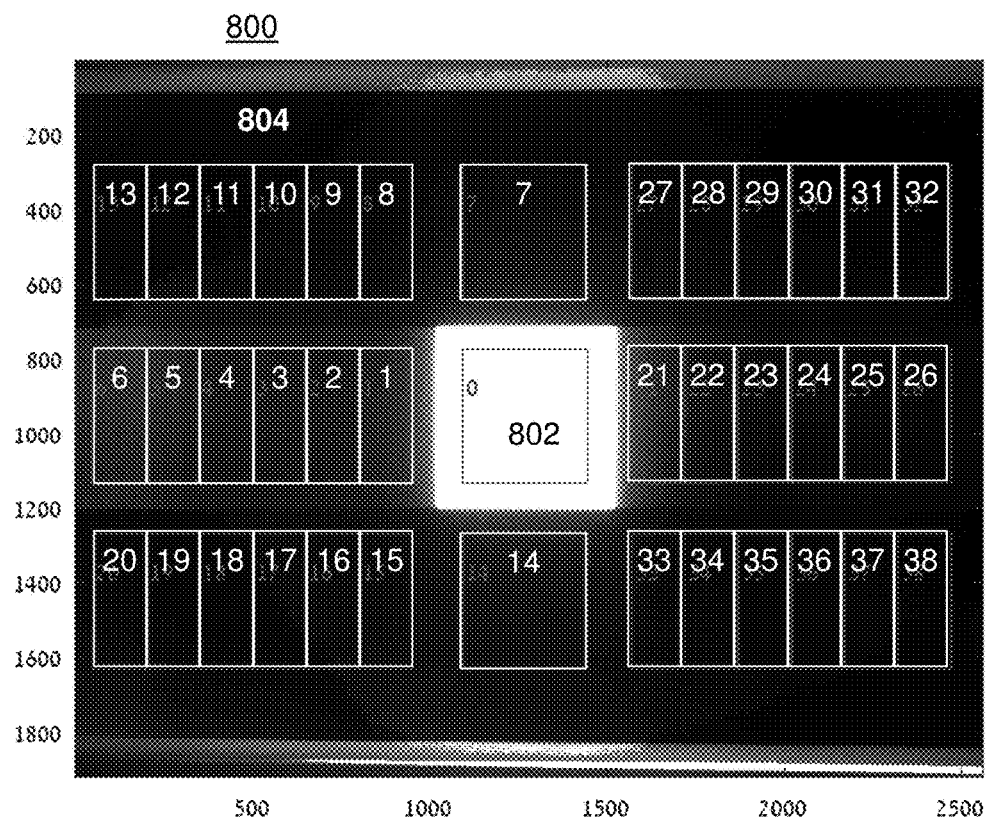
FIG. 9, there is shown the captured image with fields defined.

Referring to FIG. 9, there is shown the captured image 800 with fields defined. In step 706, a method for testing an optical device starts by defining fields in an image. One or more additional fields are defined, and optionally a first field is defined. As described above, the image is captured from the output light of the optical device, the output light generated by projecting a collimated image of a test pattern into the optical device. The optical device has a configuration similar to the external surfaces and facets of the LOE 903. A direction of propagation (954C) is of the collimated image via the set of facets (922), internal to the optical device, and parallel to the first pair of external surfaces. The first field has a first brightness level, and is in a first location within the image Each of the additional fields have a associated brightness level, and is in a associated location within the image, other than the first location.

In step 708, optionally the image is normalized.

In step 710, a metric is derived, normally via a function, based on at least one of the associated brightness levels for the optical device.

Continuing the non-limiting exemplary implementation of the current embodiment, the image is the captured image 800. The captured image 800 includes a large white square 802 that is defined as the first field F0 in the middle of the FOV over the black background 804. Additional fields F1 to F38 are defined as areas of the black background 804. Smears can be seen to the left and right of the white square 802 and look like a gray horizontal tail on the square 802, with clear edges. The first field F0 has a first brightness level of substantially white (gray level 255), and is in a first location, the center, of the captured image 800. Each of the additional fields (F1 to F38) has an associated brightness level, and is in an associated location within the image, other than the first location. For example, field F1 is adjacent to the left of the white square (802, F0) and has a brightness level of "light gray". From field F1, fields F2 to F6 are adjacent and subsequent to each other in a direction toward the left edge of the captured image 800. Each of fields F2 to F6 has an associated brightness level. On the right side of the image, from field F0, fields F21 to F26 are adjacent and subsequent to each other in a direction toward the right edge of the captured image 800. The brightness level decreases from F21 being "light gray" to F26 being substantially black.

Since the smear tail is generally less than 1% of the intensity of the white square 802, it is important to acquire the image 800 with a high dynamic range. The captured image can be represented by a matrix of gray values, designated $M_{rectangle}$ where each gray value is of a pixel of the captured image.

Typically, the captured image needs to be normalized, in particular due to the need for high dynamic range, so that the results will not depend on the LED current and the kind of LOE used, and to eliminate the influence of LOE black levels, the room illumination, and camera noise. Normalization can include the following techniques.

A collimated image is projected of a second test pattern having substantially entirely the first brightness level, in this case, an entirely white test pattern. A second captured image, a white image, is captured from the output light generated by this white test pattern from the LOE 903. Intensity is measured of the white image in the area defined as the first field F0 and averaged, resulting in a scalar intensity of the area of the white square F0, designated as a scalar $c_{white}$. Alternatively, the entire white image can be used, resulting in a matrix designated as $M_{white}$. Normalization with the white test pattern can help compensate for image brightness non-uniformity. A final image, the matrix $M_{final}$, can be calculated as:

$$M_{final} = \frac{M_{rectangle}}{c_{white}},$$

or as $$M_{final} = \frac{M_{rectangle}}{M_{white}},$$

where division is done pixel by pixel.

Alternatively, or additionally, a black background image is used to eliminate the influence of LOE black levels, the room illumination, and camera noise. This can be done by taking an image of a black slide. A collimated image is projected of a third test pattern having substantially entirely one of the associated brightness levels, in this case an entirely black test pattern. In other words, the projection of the third test pattern is not to project any test pattern. A third image, a black image, is captured from the output from the LOE 903. Intensity is measured of each pixel in the third captured image to produce a resulting matrix designated as black matrix $M_{black}$. Using the black matrix, the final image can be calculated as:

$$M_{final} = \frac{M_{square} - M_{black}}{c_{white} - M_{black}}$$

where the division is done pixel by pixel.

Using only the white matrix (normalizing by ignoring the black matrix/setting $M_{black}=0$ in the expression above) can be used to better estimate the eyes' response, at the cost of higher sensitivity to other image problems, and especially local contrast issues.

Referring also to FIG. 10, there is shown a chart of the 39 fields F0 to F38 position, size, and brightness intensity. The first column is field number, the second column is location of "Left" side of the field, the third column is location of "Top" side of the field, fourth column is "Width" of the field, fifth column is "Height" of the field, sixth column is "Minimum" intensity found in the field, and seventh column is "Maximum" intensity found in the field. As noted above, the current 39 fields are a non-limiting example, and the number, position, and size of fields can be determined based on the specific requirements of testing.

The metric can be determined using a technique such as one or more of the following.

1. Comparing at least one of the associated brightness levels to at least one previously determined brightness level. For example, the smear (brightness) in each field must be lower than the values specified in the table of FIG. 10.

2. Summing the associated brightness levels, For example, the total smear intensity defined by:

$$I_{tot} = \Sigma_{k=1}^{38} I_k$$

should be smaller than 3, for example.

3. Comparing a second additional field's associated brightness level to two brightness levels each of additional fields adjacent to the second additional field and opposite each other. For example, the relative smear, defined by a ratio of a smear tail to areas above and below fields of the smear tail:

$$I_{relative} = \sum_{k=1}^{6} \frac{I_k}{\frac{1}{2}I_{k+7} + \frac{1}{2}I_{k+14}} + \sum_{k=21}^{26} \frac{I_k}{\frac{1}{2}I_{k+7} + \frac{1}{2}I_{k+14}} < 2.$$

Different criteria can be applied to test the smear pattern of different LOE types, as the appearance of smears changes with the specifics of different LOEs.

Alternative smear characterization algorithms, include, but are not limited to:

- The criteria for the smear can be relative to the performance of an LOE that is considered good—instead of comparing to absolute values (for example, of FIG. 10).
- Measuring the ratio of the smeared fields (for example, F1 to F6 and F21 to F26 in the above example) to the not smeared fields above and below separately, which will be more sensitive to ghost images for example, but will give a more detailed smear edge diagnosis.
- Setting the criterion for the ratios of each of fields F1 to F6 and F21 to F26 with respective above and below fields separately, for higher spatial resolution at the cost of noisier outcome.
- Taking the smears right and left separately, which can be used when the smear is not symmetric.
- Finding the steepness of the transition from smeared to non-smeared regions using edge detection techniques, such as LOG (Laplacian of Gaussian), for example.
- Measuring the change of contrast of the smeared regions compared to a black image by taking for the image analysis $$M_{final} = \frac{M_{square}}{M_{black}}$$

Measuring the contrast uniformity of the smeared image, with or without the normalization and image enhancement techniques mentioned above, using statistical tools such as variance of the image or contrast image, change in average luminance or changes in the brightness level histogram shape and median.

The smear tail can be fitted to a declining function, and decline parameter can be extracted. Fast decline indicates a weak smear, and slow decline indicates a long smear tail.

Other test patterns can be sensitive to different kind of smears. The test image can be placed closer to the edges of the FOV to see a longer smear tail inside the measured FOV, the test images can be larger or smaller in horizontal and vertical directions where larger white area improve the SNR (signal to noise ratio) at the cost of adding ghost images and reducing the smeared area.

Figure 11:
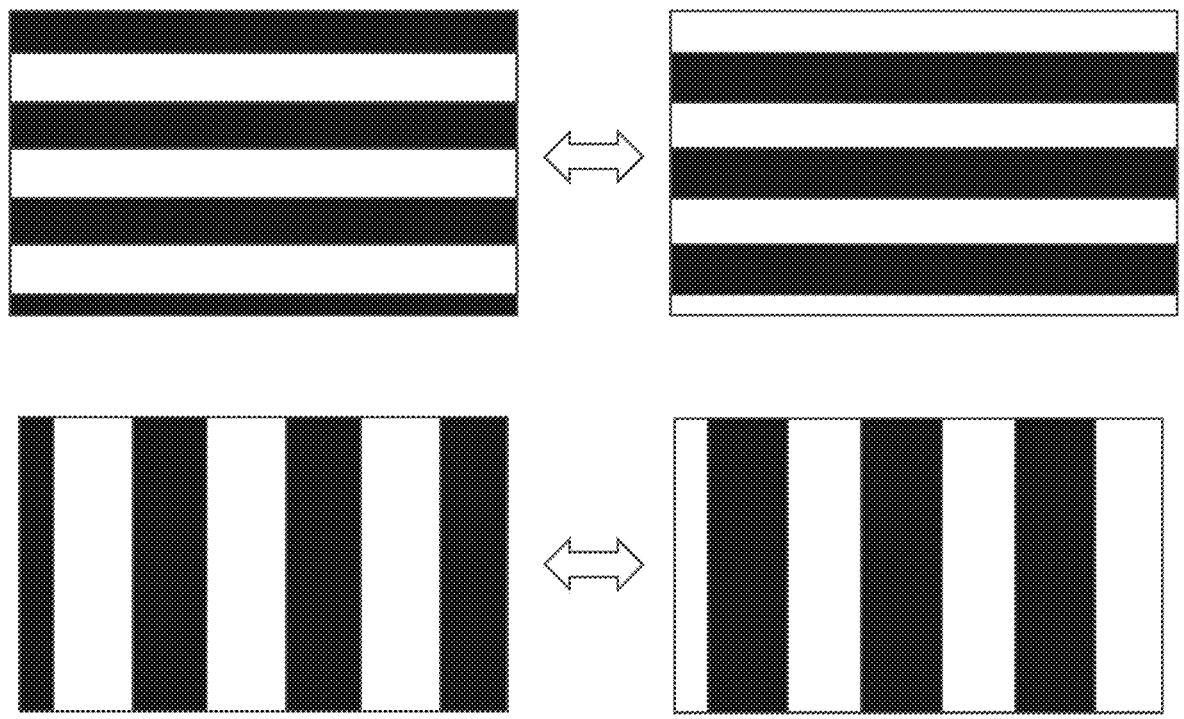
FIG. 11, there is shown alternative patterns.

Referring to FIG. 11, there is shown alternative patterns. A checkerboard-like or stripes-like contrast measurement can be used. In these cases, functions used to generate metrics such as measuring sequentially images pairs. This enables separation of smears in each direction, so both an absolute smear value can be extracted as the sequential contrast, and a relative value from the ratio or difference of the contrast of the vertical and horizontal patterns. This technique is sensitive to ghost images.

Measuring in different parts of the EMB 616 can give more data on the smears, as the smear test is position sensitive. As noted above, in the current exemplary implementation, the captured image 800 is captured is by a camera (606B) at a first of a plurality of capture locations. Capture locations are typically at the eye relief distance from the LOE (903) and in the EMB 616 of the LOE 903. The capturing can be repeated at one or more capture locations other than the first capture location, and one or more additional metrics can be derived based on the capture locations. Each capture location typically will result in one or more final images that can be processed to derive one or more metrics. The metrics can be used individually or in relation to each other to derive other metrics.

As the smears are produced as the input image propagates (in the propagation direction 954C) through the facets 922 of the LOE 903, an (output) image captured close to the proximal end 954A will have little or no smearing compared to an image captured close to the distal end 954B which will have maximum smearing.

Third Embodiment—FIG. 12A to FIG. 19

A present embodiment is a system and method for detecting the existence and degree of a "white stripes" (WS) phenomenon related to scattering and diffraction in the wedge-to-LOE interface 614. This WS scattering and diffraction can be valid for scattering and diffraction from an edge of a location at which the input coupling section meets the lightguide substrate, and from other edges along the optical path. The generation and propagation of other than the primary light rays of an image can result in the unwanted projection of lines (stripes) of varying brightness in a well-defined direction in relation to the direction of the wedge-to-LOE interface 614. A typical feature of WS is that the lines are parallel to the wedge-to-LOE interface, and not to the image that is being scattered (not related to the orientation of the input image). The unwanted lines (WS) are generally too weak to influence contrast of the output image, but are seen by the human eye. For simplicity in this embodiment, "scattering and diffraction" will be referred to as "scattering".

The varying brightness of the unwanted lines is typically lighter than the background on which the lines appear, referred to in this document as "white stripes" (WS), however darker unwanted lines can be detected and analyzed using the current method. The current method can also be used to detect similar phenomena generated by configurations other than wedge-to-LOE interface parallel to the WS.

When a bright area is present somewhere in an image being expanded by the optical system, scattering (WS) appears as sets of thin white lines on a black area. This scattering is a particular problem in Lumus's OEs (optical engines, LOEs 903) because of the lightguide technology of the LOE 903.

This scattering phenomenon may appear in other similar structures. Unlike conventional scattering, this WS scattering results in relatively thin lines (as compared to the width of the projected image), as opposed to resulting in a blurry image. Moreover, the effect of image guiding in the LOE 903 can make the line(s) appear far from the image that is being scattered.

Figure 12A:
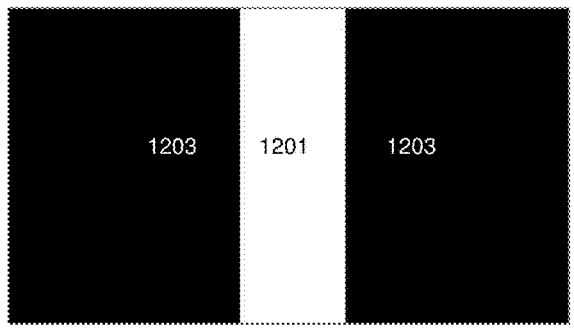
FIG. 12A, there is shown an exemplary single stripe test pattern.

Referring to FIG. 12A, there is shown an exemplary single stripe test pattern 1200, a slide containing a large white vertical rectangle 1201 in the middle of the FOV over a black background 1203.

Figure 12B:
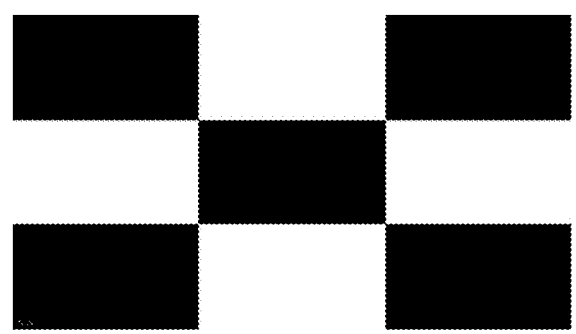
FIG. 12B, there is shown a checkerboard test pattern.

Referring to FIG. 12B, there is shown a checkerboard test pattern 1210, a slide containing an alternating pattern of black and white rectangles.

Figure 13A:
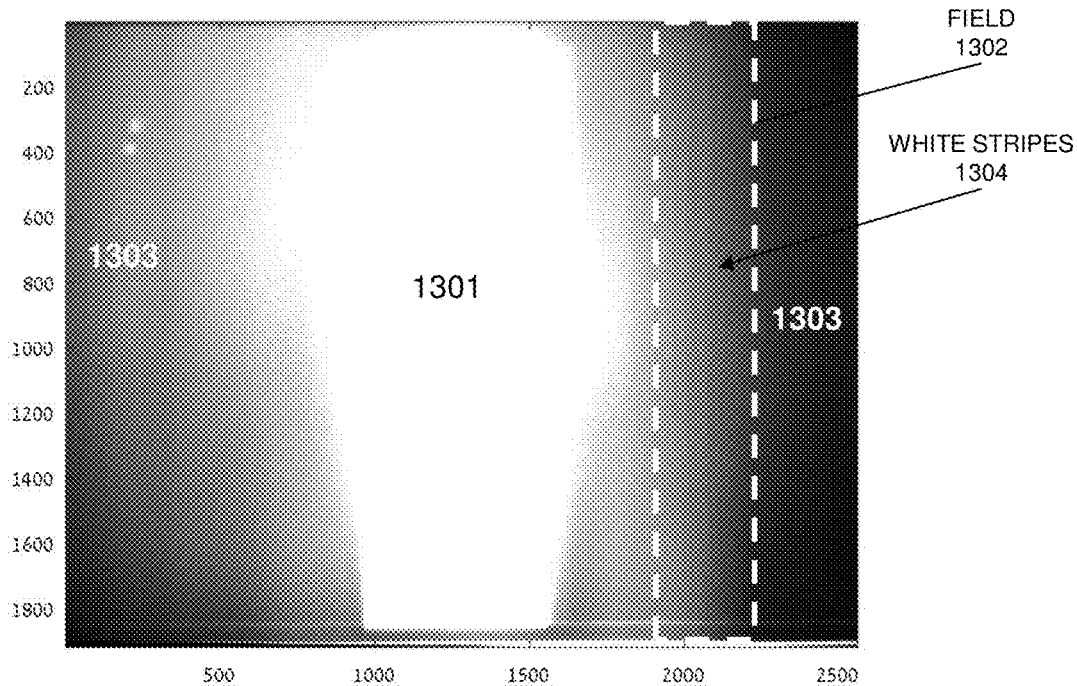
FIG. 13A, there is shown a single stripe captured image.

Referring to FIG. 13A, there is shown a single stripe captured image 1300. Using an input image of the single stripe test pattern 1200, the resulting single stripe captured image 1300 includes a white rectangular area 1301 generated from the white vertical rectangle 1201 and black areas 1303 generated from the black background 1203. The single stripe captured image 1300 shows a field 1302 having white stripes 1304 parallel and to the right side of the white vertical rectangle 1301, in the background 1303. The image is saturated, to make seeing the stripes possible.

Figure 13B:
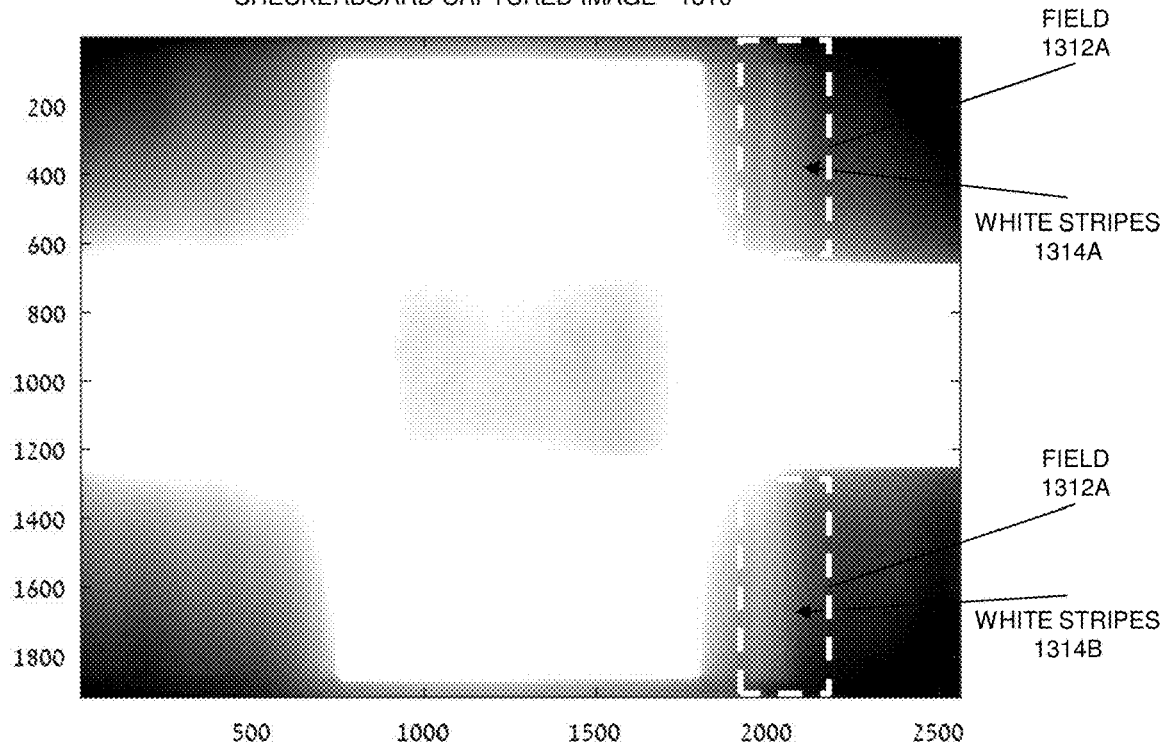
FIG. 13B, there is shown a checkerboard captured image.

Referring to FIG. 13B, there is shown a checkerboard captured image 1310. Using an input image of a the checkerboard test pattern 1210, the resulting checkerboard captured image 1310 shows field 1312A and field 1312B having respective white stripes 1314A and white stripes 1314B. The white stripes (1314A, 1314B) are parallel and to the right side of the white rectangles of the original checkerboard test pattern 1210. The image is saturated, to make seeing the stripes possible.

Note that the WS in the captured images are parallel to the white rectangles due to the orientation of the input image and optical system. As noted above, the WS lines are parallel to the wedge-to-LOE interface and not dependent on the orientation of the input test pattern. In other words, if the input test patterns were rotated or moved, the captured images would have rotated white rectangles, but the white stripes would remain in the same orientation as shown, but with a different brightness. In other words, the intensity of the WS changes, but not position. For different systems being tested (for example, different LOEs 903) a different number and shapes of lines may result.

For WS testing, the FIG. 6 flowchart for optical testing and FIG. 7 test setup can be used, as described above for smear testing. Since the white stripes are generally less than 0.5% of the intensity of the white rectangle, acquiring the captured image with a high dynamic range is important. Additionally, as will be described below, in the case of WS testing, the optional step 708 of normalizing the image is typically required. Testing has shown that for a typical LOE 903 the WS are often not seen from the first facet (922), so the position of the camera 606B may be important to collect a good captured image for testing.

Figure 14:
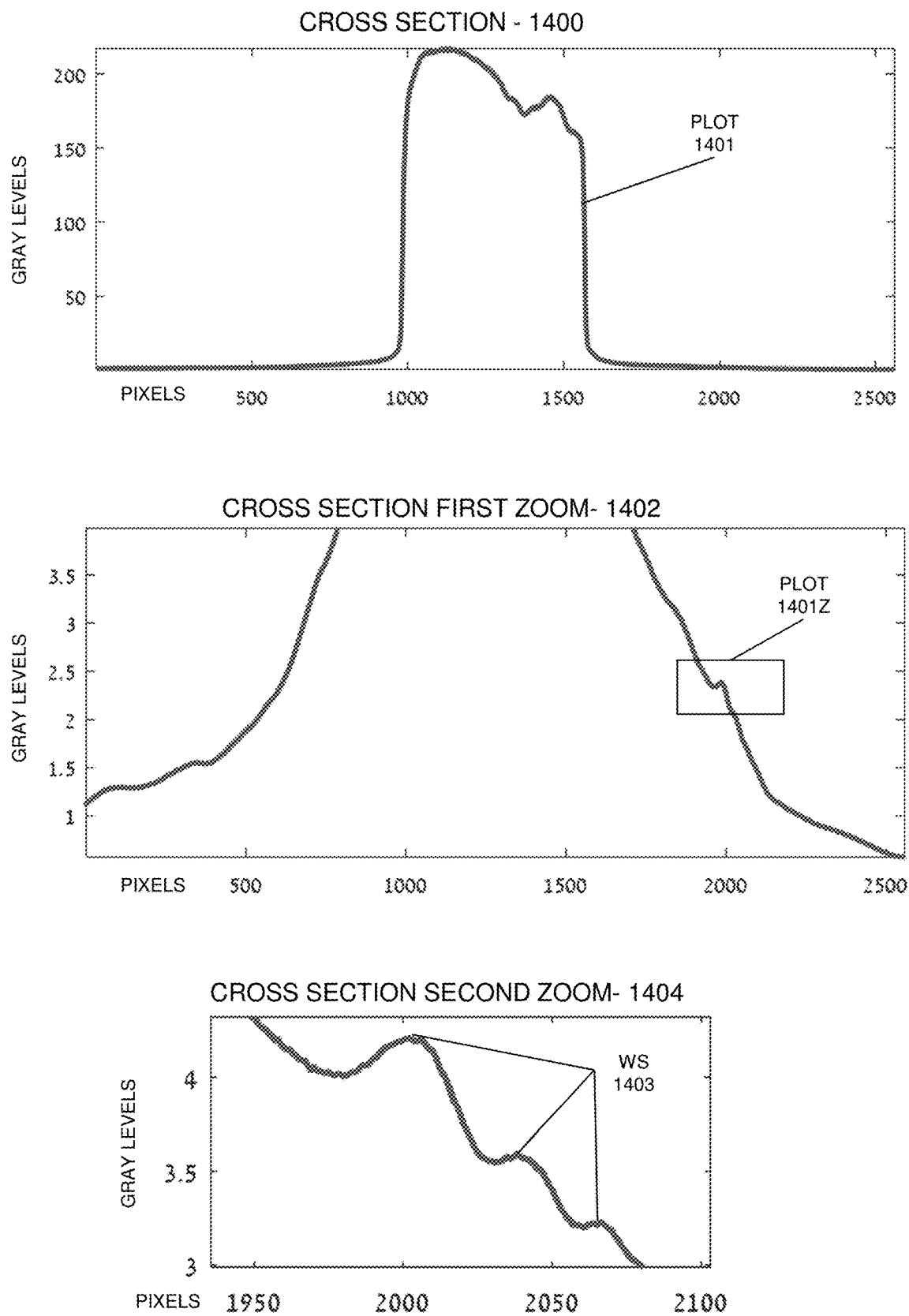
FIG. 14, there is shown a cross-section plot that could be generated from the single stripe captured image.

Referring to FIG. 14, there is shown a cross-section 1400 plot that could be generated from the single stripe captured image 1300. This exemplary image is 1920 pixels high by 2520 pixels wide. The horizontal axis is pixels across the image width, 2520 pixels. The vertical axis is averaged gray levels (0 to 255) from each row of the image height, 1920 pixels. Thus, the current figure shows a plot 1401 of the brightness as a function of position across the width of the image. White stripes are not obvious at this level of detail.

A cross-section first zoom 1402 plot zooms in on a right slope of the plot 1401, showing only about 4 gray levels (0.5 to 4) as plot area 1401Z. At this level of detail, white stripes are roughly visible.

A cross-section second zoom 1404 plot of the plot area 1401Z shows only about 1 gray level (3 to 4.5) and the difference in brightness of the white stripes (WS 1403) can be seen, as compared to the slope of brightness of the white rectangular area 1301.

Figure 15:
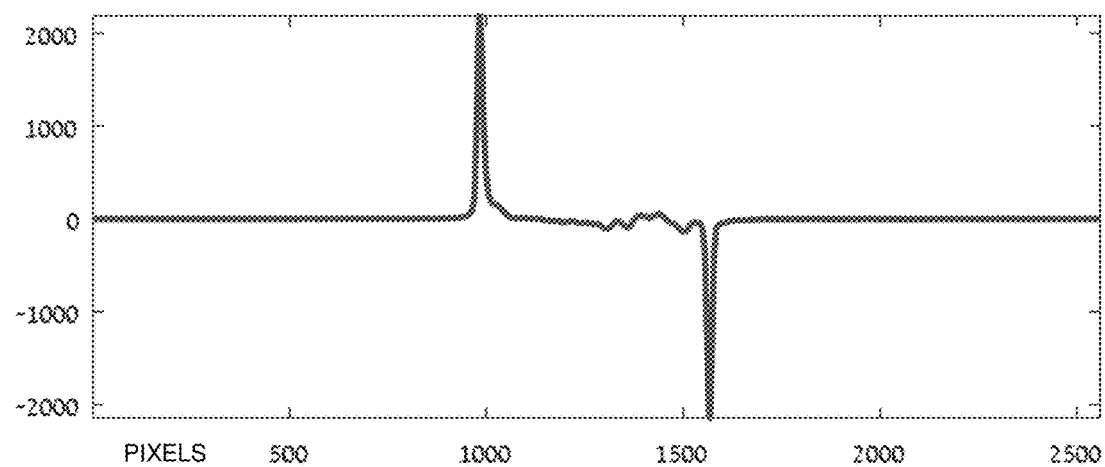
FIG. 15, there is shown a plot of a first derivative of the brightness.
Figure 15:
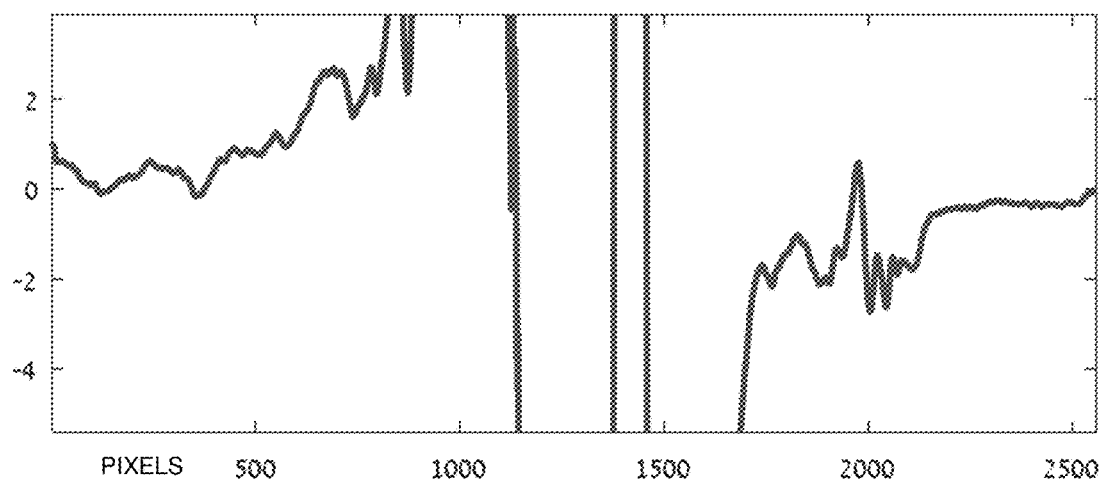

Referring to FIG. 15, there is shown a plot of a first derivative of the brightness. Taking a first derivative of the cross-section 1400 plot results in a first derivative 1500 plot, with the horizontal axis maintained as pixels of the captured image width, and a vertical axis of brightness difference between two adjacent pixels. Changes of slope can be seen more clearly in this derivative. A first derivative zoom 1502 plot is a close up of about 10 levels on the vertical axis.

Figure 16:
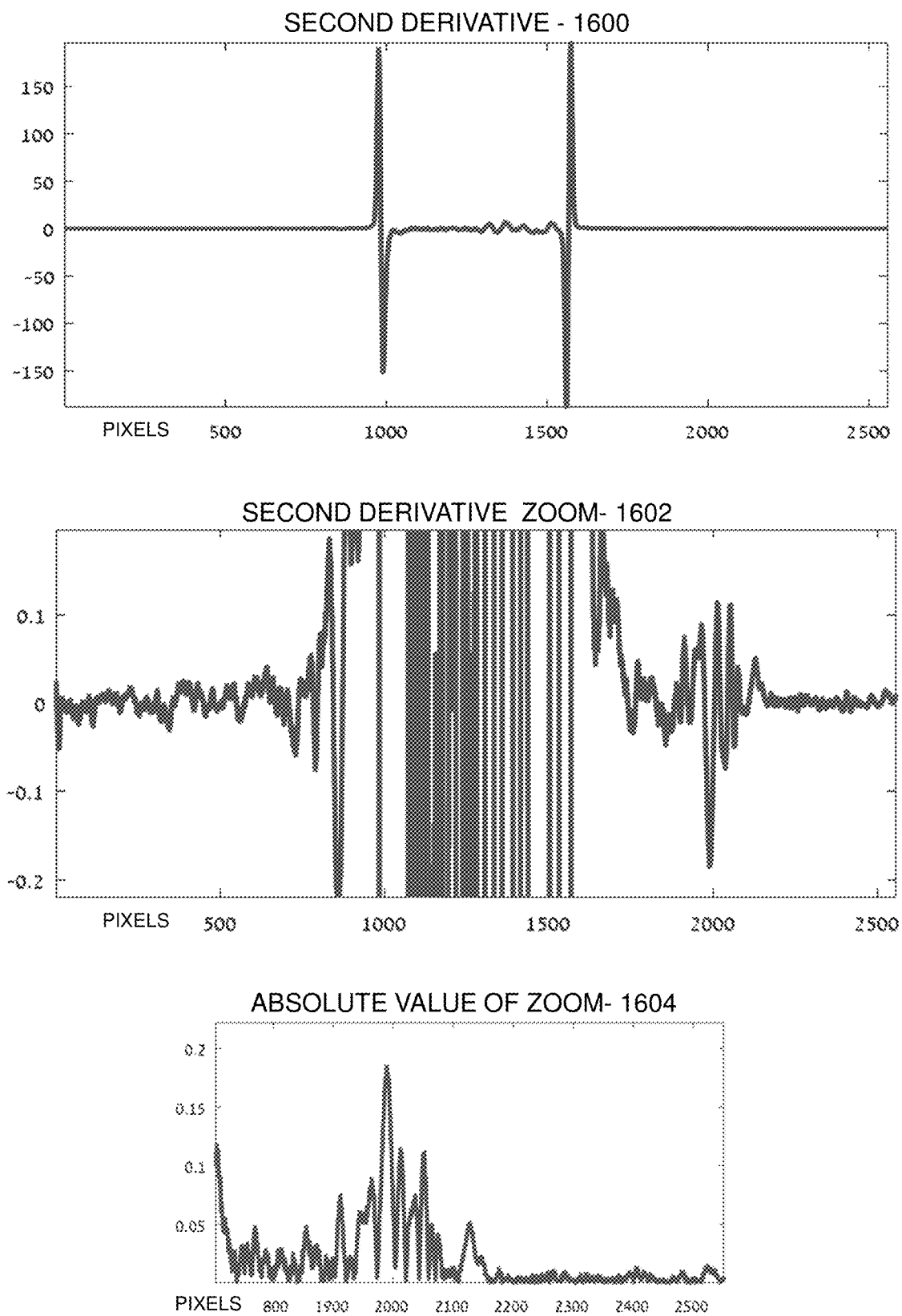
FIG. 16, there is shown a plot of a second derivative of the brightness.

Referring to FIG. 16, there is shown a plot of a second derivative of the brightness. This second derivative is known in the art of image processing as a "Laplacian filter", normally used to recognize edges in images. In this case, the Laplacian filter is being used to detect the white stripes amidst the image brightness and noise. Taking a second derivative of the first derivative 1500 plot results in a second derivative 1600 plot, with the horizontal axis maintained as pixels of the captured image width, and a vertical axis of a two-sided intensity difference. A second derivative zoom 1602 plot is a close up of about 0.4 levels on the vertical axis. Taking the absolute value of the second derivative zoom 1602 plot results in an absolute value of zoom 1604 plot. The maximum absolute value can be used as a grade for the captured image, and hence as an indication of quality of the LOE 903.

The following exemplary implementation uses the single stripe test pattern 1200 with the test setup as described in reference to FIG. 7 and the single stripe captured image 1300. The captured image can be provided by projecting a collimated image 4C of the single stripe test pattern 1200 into the optical system, the optical system being a lightguide optical element (LOE, 903) and capturing an image projected 38B by the output light from the LOE 903 to provide the captured image 1300.

Typically, the capturing is by the camera 606B at a first of a plurality of capture locations, the capture locations at an eye relief distance from the LOE 903 and in the EMB 616 of the LOE 903. Optionally, the capturing is repeated at one or more of the capture locations, other than the first capture location, to provide additional captured images. One or more additional metrics can be derived based on the (captured images at the) capture locations.

A general method for testing for WS begins by defining, in a captured image 1300, one or more fields 1302. Each of the one or more fields 1302 is in an associated location within the captured image 1300, the associated location being parallel to the coupling interface 614. At least one metric is derived based on at least one of the fields 1302.

The test pattern 1200 includes a first area having a first brightness level greater than a background brightness level of a background area. The background area is an area of the test pattern other than the first area. In a typical implementation, the first area is white (white vertical rectangle 1201), the background area is black (black background 1203) surrounding the first area, and the one or more fields are defined in the captured image background area (field 1302 in background 1303). As noted above, since the white stripes are generally less than 0.5% of the intensity of the white rectangle, the first brightness level is preferably at least substantially 200 times brighter than the background brightness level.

Normalization is an important, if not critical step in the detection method. The image intensity needs to be normalized, so that the results will not depend on the LED current and the kind of optical device (LOE) used. Normalization is typically done prior to the step of deriving, normalizing intensity (brightness) of the captured image 1300.

Figure 17:
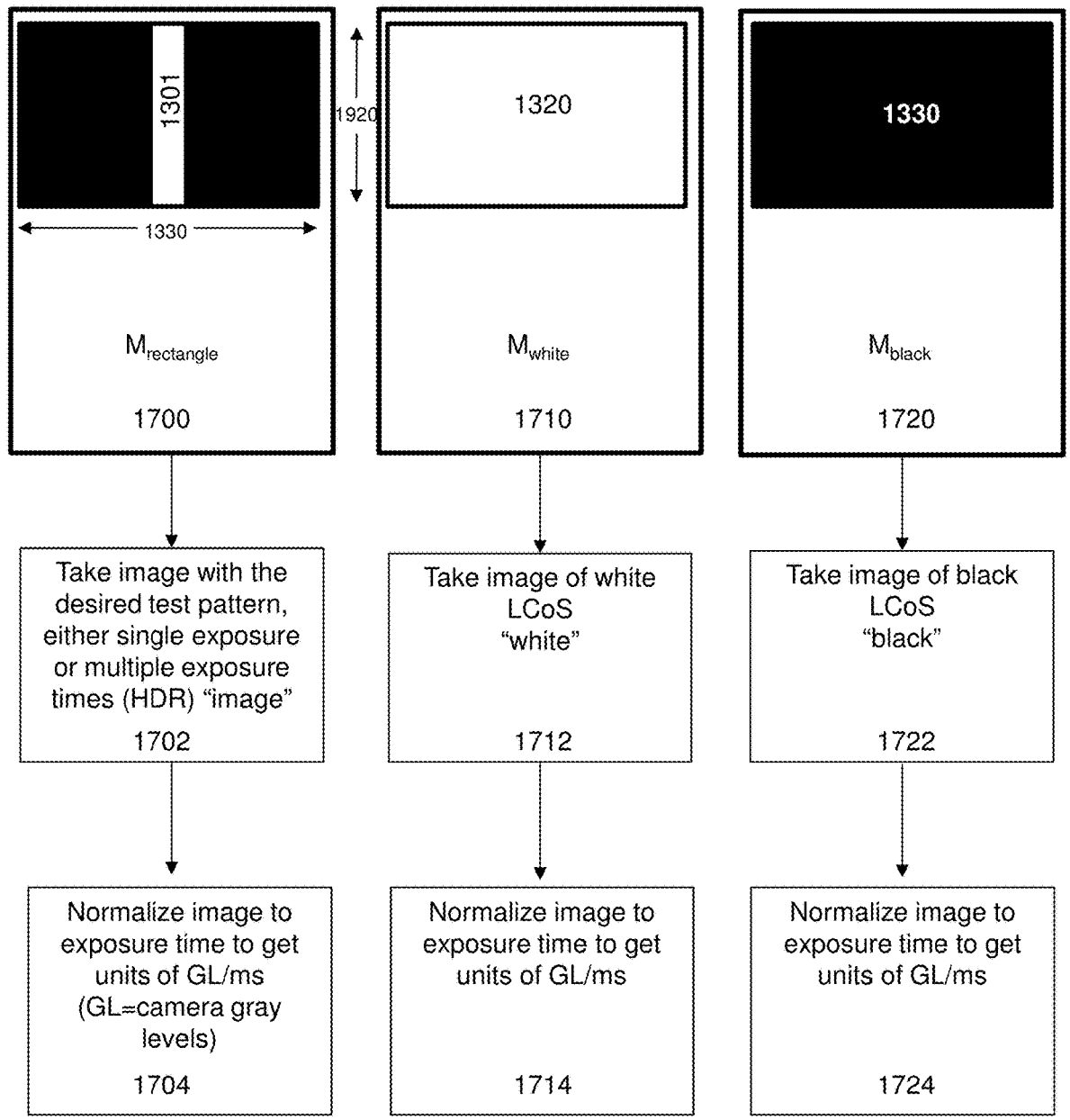
FIG. 17, there are shown several exemplary test patterns.

Referring to FIG. 17, there are shown several exemplary test patterns. In block 1700, the captured image 1300 (of test pattern 1200) is shown 1920 pixels high by 2520 pixels wide, with the white rectangular area 1301 (1920 pixels high). The captured image 1300 is represented as a matrix of brightness of pixels, $M_{rectangle}$. In block 1702, as described above, the image is acquired from the test pattern 1200. Acquisition can be from a single exposure, for example with a sufficiently high definition camera, or from multiple exposures and image processing to produce an image of sufficiently high dynamic range. In block 1704, the captured image matrix M rectangle is normalized to exposure time to get units of grey levels (GL) per millisecond (ms).

In block 1710, an all-white test pattern is used to generate an all-white captured image 1320, represented by an all-white matrix of brightness of pixels, $M_{white}$. In block 1712, the all-white captured image 1320 can be acquired from an output image generated by a white LCOS. In block 1714, the all-white matrix $M_{white}$ is normalized to exposure time to get units of GL/ms.

In block 1720, similar to the all-white captured image, an all-black test pattern is used to generate an all-black captured image 1330, represented by an all-black matrix of brightness of pixels, $M_{black}$. In block 1722, the all-black captured image 1330 can be acquired from an output image generated by a black LCOS. In block 1724, the all-black matrix $M_{white}$ is normalized to exposure time to get units of GL/ms.

Figure 18:
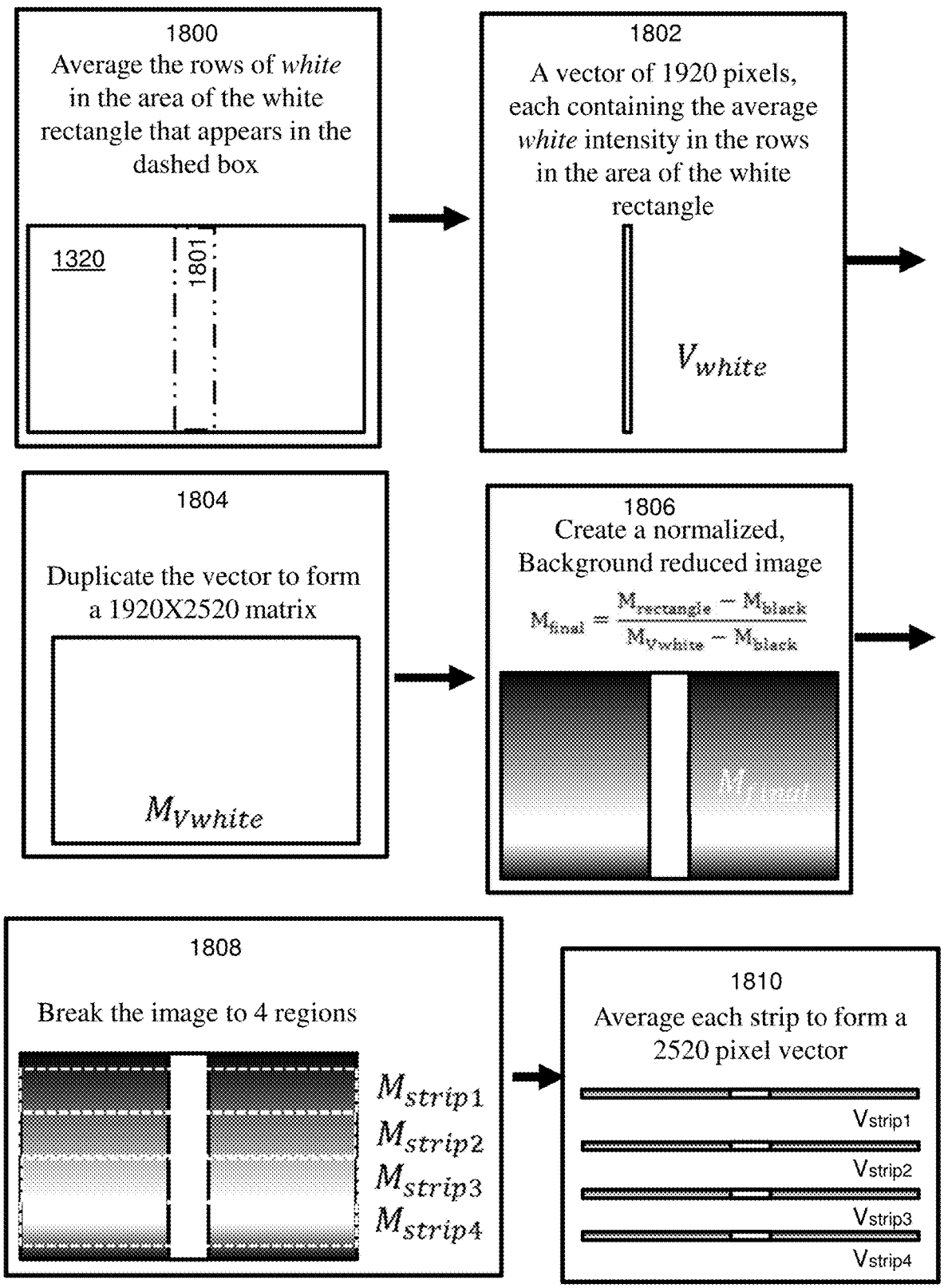
FIG. 18, there is shown an exemplary process for normalizing the captured image matrix.

Referring to FIG. 18, there is shown an exemplary process for normalizing the captured image matrix $M_{rectangle}$. In block 1800 the all-white captured image 1320 has a white rectangle 1801 designated. The area of the white rectangle 1801 corresponds to the white rectangular area 1301, is 900 pixels wide, and 1920 pixels high. The white rectangle 1801 is divided into rows (1920 rows) and in each of the 1920 rows the brightness of the 900 pixels is averaged.

In block 1802, this averaging results in an all-white vector $V_{white}$ that is 1 pixel wide (by definition) and 1920 pixels high.

In block 1804, to be used as normalization for $M_{rectangle}$, the all-white vector needs to be replicated to form an all-white vector matrix ($M_{Vwhite}$) of the same size as $M_{rectangle}$, so that all columns of the all-white vector matrix ($M_{Vwhite}$) are the all-white vector $V_{white}$.

In block 1806, in order to eliminate the influence of LOE black levels, the room illumination, camera noise, etc., the all-black matrix $M_{black}$ is subtracted from each of the captured image matrix ($M_{rectangle}$) (M and the all-white vector matrix ($M_{Vwhite}$) by:

$$M_{final} = \frac{M_{rectangle} - M_{black}}{M_{Vwhite} - M_{black}}.$$

The division is done pixel by pixel resulting in a final matrix ($M_{final}$) to be used for further processing and deriving metrics.

Experience has shown that the actual intensity of the white stripes does not determine the degree of visibility to the viewer's eye, so the evaluation is done according to the sharpness of the stripes. The degree of sharpness can be measured using an edge detection algorithm, for example, "Laplacian of Gaussian", a standard image processing technique used here for detecting WS.

In block 1808, continuing the current exemplary implementation, one method for detecting WS is to first split the captured and normalized final matrix ($M_{final}$) into to four strips The strips are horizontal portions of the final matrix, designated as $M_{strip1}$, $M_{strip2}$, $M_{strip3}$, and $M_{strip4}$. This splitting decreases the sensitivity of the measurement to tilts of the camera sensor 606B and of the LCoS display 608 for example, relative to the scattering edge or interface 614. Each strip is a matrix of 400 by 2520 camera pixels in the suggested measurement configuration above.

In block 1810, the columns of each strip are averaged to form four respective 2520 element strip vectors, $V_{strip1}$, $V_{strip2}$, $V_{strip3}$, $V_{strip4}$. While four strips are used in the current example, this is not limiting, and other numbers and various widths (heights) of strips can be used.

Figure 19:
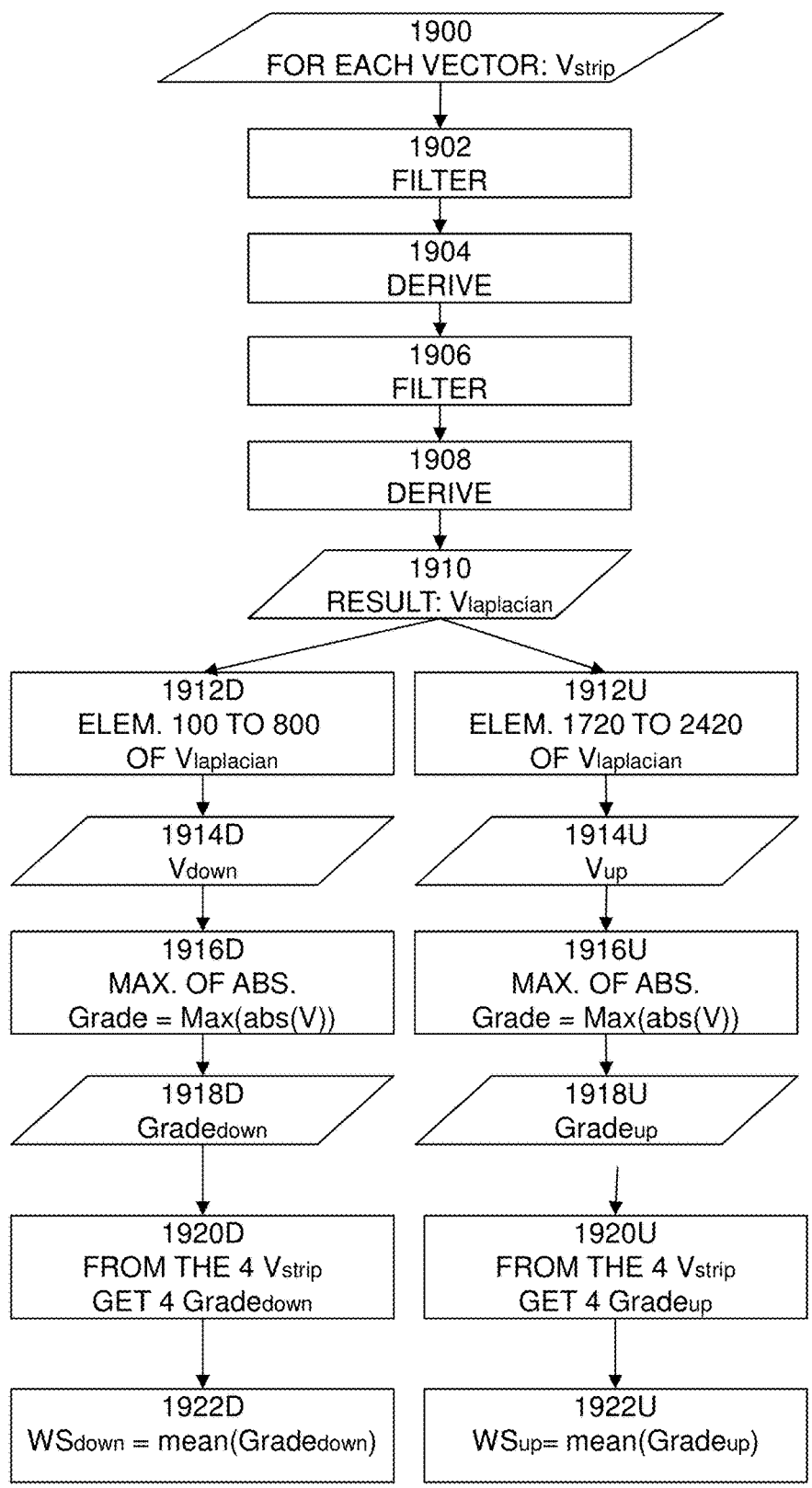
FIG. 19 there is shown a flowchart of an exemplary processing method for detecting WS.

Referring to FIG. 19 there is shown a flowchart of an exemplary processing method for detecting WS. In block 1900, for each strip vector ($V_{strip}$) the strip vector is filtered 1902, a derivation taken 1904, optionally filtered again 1906, and a second derivation taken 1908 to produce 1910 four, 2518 long Laplacian vectors ($V_{laplacian1}$, $V_{laplacian2}$, $V_{laplacian3}$, and $V_{laplacian4}$) one Laplacian vector for each respective strip vector. The derivation 1904 and second derivation 1908 are similar as described above with respect to FIG. 14, FIG. 15, and FIG. 16. The addition of filtering (1902, 1906) smoothes (filters) the data to remove noise in frequencies higher than the white stripes. In the current example, a $2^{nd}$ order Savitzky Golay filter with a range of 10 pixels (corresponding to approximately 4 LCoS pixels) is used. The use of this filter is not limiting, and any filter with similar range can be used (Gaussian etc.). In the current example, each filtered vector is derived numerically (subtraction of nearest neighbors).

A metric for the existence and extent of the WS is also referred to in the context of this document as a "grade" of the WS. The white stripe grade is preferably given separately for the right and left sides of the captured image. The white stripes appearing in the nasal direction of the FOV (the nasal side of the LOE) are termed "stripes down" and the stripes appearing in the temple direction (the direction of the POD) are termed "stripes up".

In general, a single path (for example blocks 1912D to 1922D) can be used for every segment, regardless of the number of segments. The segmentation of each Laplacian vector can be from one segment to as many segments as the number of rows. In the current figure, only two out of the four Laplacian vectors ($V_{laplacian}$) are described in the parallel paths (blocks 1912D to 1922D and blocks 1912U to 1922U). In the current example, for each Laplacian vector ($V_{laplacian}$), the "down" (stripes down) grade (block 1918D) is the maximum of pixels 100 to 800 (blocks 1912D, 1914D, 1916D) and the "up" (stripes up) grade (block 1918U) is the maximum of pixels 1720 to 2420 (block 1912U, 1914U, 1916U). From the four average "down" and "up" grades (blocks 1920D, 1920U) of the four $V_{laplacian}$ vectors, final "down" and "up" grades (blocks 1922D, 1922U) can be derived This averaging can be used as a criterion for determining if the performance of the LOE 903 is sufficient for use (passing the test), or if the LOE 903 is not suitable for an intended use. One exemplary criterion for passing is "up" and "down" grades <3e-6.

Alternatively, or in addition to the above example implementation, other approaches can be used to measure WS, for example:

Different location size and location of the test pattern,
Different image sectioning,
Different image enhancement techniques,
Different edge detection techniques,
Checkerboard contrast variation, and
Techniques used for "smear" detection can also be applied to test for WS.

Metrics can be derived using a variety of techniques, including:

A table of values—comparing brightness levels within the one or more fields to at least one previously determined brightness level,
Total intensity—summing brightness levels within the one or more fields, and
Comparison—comparing a first brightness level to at least one other brightness level within the one or more fields.

Based on the current description, one skilled in the art will be able to implement one or more approaches to testing of optical scattering from interfaces, in particular to measuring the scattering and diffracting of optical elements resulting in lines, such as white stripes.

The resulting metric or metrics can be used as a figure (figures) of merit to evaluate the optical device, such as the LOE 903. The metric can be used for quality control to determine if projected output of the LOE 903 is acceptable or outside the desired range of performance. Evaluation can include if the metrics are above or below given values, inside or outside a given range, or relative to an absolute or variable value. Evaluation can include disposition of the device, for example if the LOE 903 passes, fails, or at what level of operation. Various levels of operation may be used (or for example sold) for various applications requiring (only) a certain level of operation quality and/or performance.

Metrics can also be used for process control—feeding the resulting metrics back into the manufacturing and design processes to improve design and manufacturing of the optical devices.

Note that a variety of implementations for modules and processing are possible, depending on the application. Modules are preferably implemented in software, but can also be implemented in hardware and firmware, on a single processor or distributed processors, at one or more locations. The above-described module functions can be combined and implemented as fewer modules or separated into sub-functions and implemented as a larger number of modules. Based on the above description, one skilled in the art will be able to design an implementation for a specific application.

Note that the above-described examples, numbers used, and exemplary calculations are to assist in the description of this embodiment. Inadvertent typographical errors, mathematical errors, and/or the use of simplified calculations do not detract from the utility and basic advantages of the invention.

To the extent that the appended claims have been drafted without multiple dependencies, this has been done only to accommodate formal requirements in jurisdictions that do not allow such multiple dependencies. Note that all possible combinations of features that would be implied by rendering the claims multiply dependent are explicitly envisaged and should be considered part of the invention.

It will be appreciated that the above descriptions are intended only to serve as examples, and that many other embodiments are possible within the scope of the present invention as defined in the appended claims.

What is claimed is:

1. A method for testing an optical device, the method comprising the steps of:
    (a) defining at least one region of interest (ROI) in each of a plurality of captured images,
        (i) each said captured image:
            (A) including a test pattern,
            (B) captured from the output light of the optical device, said output light generated by projecting a collimated image of said test pattern into the optical device, and
            (C) captured at a different location within an active area of the optical device, relative to the optical device, said active area used by a user for viewing said output light,
        (ii) each region of interest including a portion of said test pattern,
    (b) extracting a plurality of cross-sections from each of said at least one region of interest, wherein each of said plurality of cross-sections includes an area of said portion of said test pattern, thereby forming a corresponding set of cross-sections for each region of interest for each portion of said test pattern, and
    (c) for each portion of said test pattern, comparing said corresponding sets of cross-sections to determine a metric for the optical device.

2. The method of claim 1 further including the step of: projecting a collimated image of said test pattern into a lightguide optical element (LOE) and capturing a plurality of images projected from said LOE to generate said plurality of captured images, said capturing of each image at a different said location relative to the optical device.

3. The method of claim 2 wherein said capturing is by a camera moving orthogonal to an output surface of said LOE, said moving being within said active area that is used by a user for viewing said output light projected from said LOE.

4. The method of claim 3 wherein said LOE includes an array of partially reflecting surfaces, each surface separated from an adjacent surface by a facet-spacing distance, said camera having an aperture set at said facet-spacing.

5. The method of claim 1 wherein said at least one region of interest includes a first region of interest orthogonal to a second region of interest.

6. The method of claim 5 wherein said test pattern is a cross-hair, said first region of interest is of a vertical portion of said cross-hair and said second region of interest is of a horizontal portion of said cross-hair.

7. The method of claim 1 wherein for each region of interest said plurality of cross-sections are sequential in a direction from an origin of said test pattern to a point on an edge of said test pattern.

8. The method of claim 1 wherein for each region of interest said plurality of cross sections are averaged with each other to generate a single averaged cross-section.

9. The method of claim 1 wherein said metric is based on said location relative to the optical device.

10. The method of claim 9 wherein said metric is calculated from said cross-sections using a technique selected from the group consisting of:
    (a) full width at half maximum (FWHM),
    (b) mean peak width,
    (c) standard deviation of peak width,
    (d) first derivative of peaks widths,
    (e) second derivative of peaks widths,
    (f) largest peak width,
    (g) max peak shift from expected location,
    (h) standard deviation of peak shift,
    (i) mean modulation transfer function at Nyquist frequency,
    (j) mean modulation transfer function at a frequency other than Nyquist frequency,
    (k) standard deviation of transfer function at Nyquist frequency, and
    (l) standard deviation of transfer function at a frequency other than Nyquist frequency.

11. A computer usable non-transitory storage medium having a computer program embodied thereon for causing a suitably programmed system to test an optical device by performing the following steps when such program is executed on the system, the steps comprising:
    (a) defining at least one region of interest (ROI) in each of a plurality of captured images,
        (i) each said captured image:
            (A) including a test pattern,
            (B) captured from the output light of the optical device, said output light generated by projecting a collimated image of said test pattern into the optical device, and
            (C) captured at a different location within an active area of the optical device, relative to the optical device, said active area used by a user for viewing said output light,
        (ii) each region of interest including a portion of said test pattern,
    (b) extracting a plurality of cross-sections from each of said at least one region of interest, wherein each of said plurality of cross-sections includes an area of said portion of said test pattern, thereby forming a corresponding set of cross-sections for each region of interest for each portion of said test pattern, and
    (c) for each portion of said test pattern, comparing said corresponding sets of cross-sections to determine a metric for the optical device.

* * * * *